United States Patent
Rose et al.

(10) Patent No.: US 12,250,496 B2
(45) Date of Patent: Mar. 11, 2025

(54) COMMUNICATION SESSIONS WITH AUTONOMOUS SECURITY DEVICE PREPARATION

(71) Applicant: SimpliSafe, Inc., Boston, MA (US)

(72) Inventors: Zachary William Rose, Natick, MA (US); Bojan Rajkovic, Salem, MA (US); Justin Forrest, Boston, MA (US)

(73) Assignee: SimpliSafe, Inc., Boston, MA (US)

( * ) Notice: Subject to any disclaimer, the term of this patent is extended or adjusted under 35 U.S.C. 154(b) by 0 days.

(21) Appl. No.: 18/338,761

(22) Filed: Jun. 21, 2023

(65) Prior Publication Data
US 2024/0259532 A1    Aug. 1, 2024

Related U.S. Application Data

(60) Provisional application No. 63/482,137, filed on Jan. 30, 2023.

(51) Int. Cl.
H04N 7/18      (2006.01)
H04N 23/62     (2023.01)
H04N 23/661    (2023.01)

(52) U.S. Cl.
CPC ............ *H04N 7/183* (2013.01); *H04N 23/62* (2023.01); *H04N 23/661* (2023.01)

(58) Field of Classification Search
CPC ............................ H04N 23/62; H04N 23/661
See application file for complete search history.

(56) References Cited

U.S. PATENT DOCUMENTS

| | | | |
|---|---|---|---|
| 11,063,989 B2* | 7/2021 | Morgan | H04L 67/02 |
| 11,064,208 B2* | 7/2021 | Amini | H04W 24/08 |
| 11,743,303 B2* | 8/2023 | Bishop | H04L 69/18 |
| | | | 726/2 |
| 2014/0115114 A1* | 4/2014 | Garmark | H04L 65/60 |
| | | | 709/219 |
| 2017/0200356 A1* | 7/2017 | Kim | H04N 7/183 |
| 2017/0301201 A1* | 10/2017 | Siann | H04N 21/44227 |

(Continued)

FOREIGN PATENT DOCUMENTS

CN    114 024 941 A    2/2022

OTHER PUBLICATIONS

Alvestrand, "Overview: Real-Time Protocols for Browser-Based Applications", Internet Engineering Task Force RFC 8825, ISSN 2070-1721 (Jan. 2021).

(Continued)

*Primary Examiner* — Boubacar Abdou Tchoussou
(74) *Attorney, Agent, or Firm* — Finch & Maloney PLLC

(57) ABSTRACT

A method includes receiving, by a first device, a request from a second device to participate in a session, the request being a message compliant with a webRTC framework and including an identifier of a process hosted by the second device; verifying, by the first device, a type of the process hosted by the second device based on the identifier; initiating, by the first device, one or more actions on the first device in response to verification of the type of the process, the actions being other than those to communicate data between the first device and second device; and establishing, by the first device, the session with the second device after initialization of the actions on the first device.

19 Claims, 16 Drawing Sheets

(56) References Cited

U.S. PATENT DOCUMENTS

2019/0141088 A1    5/2019   Morgan et al.
2024/0007720 A1*   1/2024   Saxena ................ H04N 21/437

OTHER PUBLICATIONS

Rescorla, "Security Considerations for WebRTC", Internet Engineering Task Force RFC 8826, ISSN2010-1721 (Jan. 2021).
Rescorla, "WebRTC Security Architecture", Internet Engineering Task Force RFC 8827, ISSN 2070-1721 (Jan. 2021).
Uberti et al., "WebRTC IP Address Handling Requirements", Internet Engineering Task Force RFC 8828, ISSN 2070-1721 (Jan. 2021).
Uberti et al., "JavaScript Session Establishment Protocol (JSEP)", Internet Engineering Task Force RFC 8829, ISSN 2070-1721 (Jan. 2021).
Jesup et al., "WebRTC Data Channels", Internet Engineering Task Force RFC 8831, ISSN 2070-1721 (Jan. 2021).
Jesup et al., "WebRTC Data Channel Establishment Protocol", Internet Engineering Task Force RFC 8832, ISSN 2070-1721 (Jan. 2021).
Thomson, "Application-Layer Protocol Negotiation (ALPN) for WebRTC", Internet Engineering Task Force RFC 8833, ISSN 2070-1721 (Jan. 2021).
Perkins et al., "Media Transport and Use of RTP in WebRTC", Internet Engineering Task Force RFC 8834, ISSN 2070-1721 (Jan. 2021).
Alvestrand, "Transports for WebRTC", Internet Engineering Task Force RFC 8835, ISSN 2070-1721 (Jan. 2021).
Uberti, "WebRTC Forward Error Correction Requirements", Internet Engineering Task Force RFC 8854, ISSN 2070-1721 (Jan. 2021).
Valin et al., "WebRTC Audio Codec and Processing Requirements", Internet Engineering Task Force RFC 7874, ISSN 2070-1721 (May 2016).
Proust, "Additional WebRTC Audio Codecs for Interoperability", Internet Engineering Task Force RFC 7875, ISSN 2070-1721 (May 2016).
Roach, "WebRTC Video Processing and Codec Requirements", Internet Engineering Task Force RFC 7742, ISSN 2070-1721 (Mar. 2016).
Perumal et al., "Session Traversal Utilities for NAT (STUN) Usage for Consent Freshness", Internet Engineering Task Force RFC 7675, ISSN 2070-1721 (Oct. 2015).
Holmberg et al., "Web Real-Time Communication Use Cases and Requirements", Internet Engineering Task Force RFC 7478, ISSN 2070-1721 (Mar. 2015).
Communication Relating to the Results of the Partial International Search and Provisional Opinion Accompanying the Partial Search Result, PCT Application PCT/US2024/012605 (13 pages) (mailed May 10, 2024).
International Search Report and Written Opinion, PCT Application PCT/US2024/012605 (17 pages) (mailed Jul. 1, 2024).

* cited by examiner

COMMUNICATION SESSIONS WITH AUTONOMOUS SECURITY DEVICE PREPARATION

RELATED APPLICATIONS

This application claims priority under 35 U.S.C. § 119(e) to U.S. Provisional Application Ser. No. 63/482,137, titled "COMMUNICATION SESSIONS WITH AUTONOMOUS SECURITY DEVICE PREPARATION," filed Jan. 30, 2023, which is hereby incorporated herein by reference in its entirety.

TECHNICAL FIELD

Aspects of the technologies described herein relate to security systems and methods.

BACKGROUND

Some monitoring systems use one or more cameras to capture images of areas around or within a residence or business location. Such monitoring systems can process images locally and transmit the captured images to a remote service. If motion is detected, the monitoring systems can send an alert to one or more user devices.

SUMMARY

In at least one example, a method is provided. The method includes receiving, by a first device, a request from a second device to participate in a session, the request being a message compliant with a webRTC framework and including an identifier of a process hosted by the second device; verifying, by the first device, a type of the process hosted by the second device based on the identifier; initiating, by the first device, one or more actions on the first device in response to verification of the type of the process, the actions being other than those to communicate data between the first device and second device; and establishing, by the first device, the session with the second device after initialization of the actions on the first device.

Examples of the method can incorporate one or more of the following features.

In the method, the one or more actions can configure the first device for the session and can include actions that are defined outside of the webRTC framework. In the method, initiating the one or more actions can include initiating a process that controls a user interface of the first device to output an indication of a type of the process, initiating a process that records the session, or initiating a process that aborts the session. The process that controls the user interface can control a light emitting diode to illuminate in a color or a pattern associated with the type of the process. The process that records the session can determine that the process is a monitor interface. The process that aborts the session can determine that the process is a monitor interface and can determine that an event associated with the session is canceled. Receiving, by the first device, the request including the identifier of the process can include receiving, by a location-based device, an identifier of either a customer interface or monitor interface. Receiving the identifier of either a customer interface or a monitor interface can include receiving, by an image capture device, the identifier of either the customer interface or the monitor interface. Receiving the identifier of either a customer interface or a monitor interface can include receiving an identifier that specifies the type of the process, a timestamp, and an identifier of the first device. The method can further include determining an actual identifier of the first device and comparing the identifier of the first device to the actual identifier of the first device as part of a process to validate the identifier of the process. The method can further include encoding, by the process, the identifier to specify the type of the process, a timestamp, and the identifier of the first device. In the method, establishing the session can include establishing a session in compliance with the webRTC framework.

In another example, a first device is provided. The first device includes memory, a network interface, and at least one processor coupled to the memory and the network interface. The at least one processor is configured to receive, via the network interface from a second device, a request to participate in a session, the request comprising a message compliant with a webRTC framework and including an identifier of a process hosted by the second device, verify a type of the process hosted by the second device based on the identifier, initiate one or more actions in response to verification of the type of the process, the actions being other than those to communicate data between the first device and second device, and establish the session with the second device after initialization of the actions on the first device.

Examples of the first device can incorporate one or more of the following features.

In the first device, the one or more action can configure the first device for the session and can include actions that are not specified within, or natively supported by, the webRTC framework. In the first device, to initiate the one or more actions can include to initiate a process to control a user interface of the first device to output an indication of a type of the process, to initiate a process to record the session, or to initiate a process to selectively abort the session. To control the user interface can include to control a light emitting diode to illuminate in a color or a pattern associated with the type of the process. To record the session can include to determine that the process is a monitor interface. To selectively abort the session can include to determine that the process is a monitor interface and to determine that an event associated with the session is canceled. The first device can be a location-based device. To receive the request including the identifier of the process can include to receive an identifier of either a customer interface or monitor interface. The location-based device can include a camera. To receive the identifier of either a customer interface or a monitor interface can include to receive the identifier of either the customer interface or the monitor interface. To receive the identifier of either a customer interface or a monitor interface can include to receive an identifier that specifies the type of the process, a timestamp, and an identifier of the first device. The at least one processor can be further configured to determine an actual identifier of the first device and compare the identifier of the first device to the actual identifier of the first device as part of a process to validate the identifier of the process. The at least one processor can be further configured to decode the identifier to determine the type of the process, a timestamp, and the identifier of the first device. In the first device, to establish the session can include to establish a session in compliance with the webRTC framework.

In another example, a security system is provided. The security system includes a first device hosting a first process configured to receive an identifier of a second process requesting to participate in the real time communication session with the first process; determine a type of the second process based on the identifier; configure the first device for the real time communication session based on the type of the second process, wherein to configure comprises to initiate one or more processes on the first device or to set one or more operational parameters of the first device other than communication session parameters; and establish, subsequent to configuration of the first device, the real time communication session with the second process.

Examples of the security system can incorporate one or more of the following features.

In the security system, to initiate the one or more processes can include to initiate a process that controls a user interface of the first device to output an indication of the type of the second process, to initiate a process that records the real time communication session, or to initiate a process that aborts the real time communication session. To initiate the process that controls the user interface can include to initiate a process that controls a light emitting diode to illuminate in a color or a pattern associated with the type of the second process. To initiate the process that records the real time communication session can include to determine that the type of the second process is a monitor interface. To initiate the process that aborts the real time communication session can include to determine that the type of the second process is a monitor interface and to determine that an event associated with the real time communication session is canceled. To receive the identifier of the second process can include to receive, by a first process hosted by a location-based device, an identifier of either a customer interface or monitor interface. To receive the identifier of either a customer interface or a monitor interface can include to receive, by a camera agent hosted on image capture device, the identifier of either the customer interface or the monitor interface. To receive the identifier of either a customer interface or a monitor interface can include to receive an identifier that specifies the type of the second process, a timestamp, and an identifier of the first device. The first process can be further configured to determine an actual identifier of the first device and compare the identifier of the first device to an actual identifier of the first device as part of a process to validate the identifier of the second process. The security system can further include a second device hosting the second process. The second process can be further configured to encode the identifier to specify the type of the second process, a timestamp, and the identifier of the first device.

In another example, a method is provided. The method includes receiving, by a first device, a request from a second device to participate in a session, the request including an indication of a user accessing the second device, and the session being configured to enable input received from the user by the first device to be output via the second device in less than 600 milliseconds from receipt; identifying, by the first device, a type of the user based on the indication; initiating, by the first device, one or more actions on the first device in response to identification of the type of the user, the one or more actions being other than those utilized to communicate data between the first device and second device; and establishing, by the first device, the session with the second device after initialization of the one or more actions on the first device.

Examples of the method can incorporate one or more of the following features.

In the method, the indication of the user includes an identifier of a process hosted by the second device, wherein identifying the type of the user comprises identifying a type of the process. Initiating the one or more actions can include initiating a process that controls a user interface of the first device to output an indication of a type of the process, initiating a process that records the session, or initiating a process that aborts the session. The process that controls the user interface can control a light emitting diode to illuminate in a color or a pattern associated with the type of the process. The process that records the session can determine that the type of the user is a monitoring professional. The indication of the user includes an identifier of a process hosted by the second device. The process that records the session can determine that the type of the user is a monitoring professional by determining, based on the identifier, that the process hosted by the second device is a monitor interface. The process that aborts the session can determine that the process hosted by the second device is a monitor interface; and can determine that an event associated with the session is canceled. Receiving, by the first device, the request including the indication of the user can include receiving, by a location-based device, an indication of either a customer or a monitoring professional. Receiving the indication of either a customer or a monitoring professional can include receiving, by an image capture device, the indication of either a customer or a monitoring professional. Receiving the indication of either a customer or a monitoring professional can include receiving an identifier that specifies a type of a process hosted by the second device, a timestamp, and an identifier of the first device. The method can further include determining an actual identifier of the first device and comparing the identifier of the first device to the actual identifier of the first device as part of a process to validate the indication of the user. The method can further include encoding, by the process, the indication specifying the type of the user, a timestamp, and the identifier of the first device.

In another example, a method is provided. The method includes receiving, by a first device comprising an active siren, a request to prepare for remote intervention from a second device, the first device participating with the second device within a session established via a webRTC framework; silencing, by the first device, the active siren responsive to receipt of the request; transmitting, by the first device, a response to the second device, the response specifying that the active siren was successfully silenced; receiving, by the first device from the second device via the session, audio content; and outputting, by the first device, the audio content.

Examples of the method can incorporate one or more of the following features.

The method can further include transmitting, by the first device, a message to at least one other device located at a same location as the first device, the message specifying a request to lower a volume of a siren controlled by the at least one other device. The method can further include transmitting, by the at least one other device, a message to one or more other devices located at the same location as the at least one other device, the message requesting to lower a volume of a siren controlled by the one or more other devices. In the method, receiving the request to prepare for remote intervention can include receiving the request via a data channel of the session. The method can further include outputting a first cue prior to outputting the audio content. The method can further include outputting a second cue after outputting the audio content. The method can further include reinstating the active siren after outputting the second cue. The method can further include transmitting, by the first device, a message to at least one other device located at a same location as the first device, the message specifying a request to reinstate a volume of a siren controlled by the at least one other device. The method can further include transmitting, by the at least one other device, a message to one or more other devices located at the same location as the at least one other device, the message requesting to reinstate a volume of a siren controlled by the one or more other devices. The method can further include rendering, by a user interface of the second device, an indication that the active siren was successfully silenced.

In another example, a security system is provided. The security system includes a first device participating with a second device within a session established via a webRTC framework and comprising an active siren. The first device is configured to receive a request to prepare for remote intervention from the second device, silence the active siren responsive to receipt of the request, transmit a response to the second device, the response specifying that the active siren was successfully silenced, receive, from the second device via the session, one or more messages specifying audio content, and output the audio content.

Examples of the security system can incorporate one or more of the following features.

In the system, the first device can be further configured to transmit a message to at least one other device located at a same location as the first device, the message specifying a request to lower a volume of a siren controlled by the at least one other device. The system can further include the at least one other device. The at least one other device can be configured to transmit one or more messages to one or more other devices located at the same location as the at least one other device, the one or more messages specifying one or more requests to lower one or more volumes of one or more sirens controlled by the one or more other devices. In the system, to receive the request to prepare for remote intervention can include to receive the request via a data channel of the session. The first device can be further configured to output a first cue prior to the audio content. The first device can be further configured to output a second cue after the audio content. The first device can be further configured to reinstate the active siren after output of the second cue. The first device can be further configured to transmit a message to at least one other device located at a same location as the first device, the message specifying a request to reinstate a volume of a siren controlled by the at least one other device. The system can further include the at least one other device. The at least one other device can be configured to transmit one or more messages to one or more other devices located at the same location as the at least one other device, the one or more messages specifying one or more requests to reinstate one or more volumes of one or more sirens controlled by the one or more other devices. The system can further include the second device. The second device can be configured to render, by a user interface, an indication that the active siren was successfully silenced.

BRIEF DESCRIPTION OF THE DRAWINGS

Additional examples of the disclosure, as well as features and advantages thereof, will become more apparent by reference to the description herein taken in conjunction with the accompanying drawings which are incorporated in and constitute a part of this disclosure. The figures are not necessarily drawn to scale.

DETAILED DESCRIPTION

Figure 1:
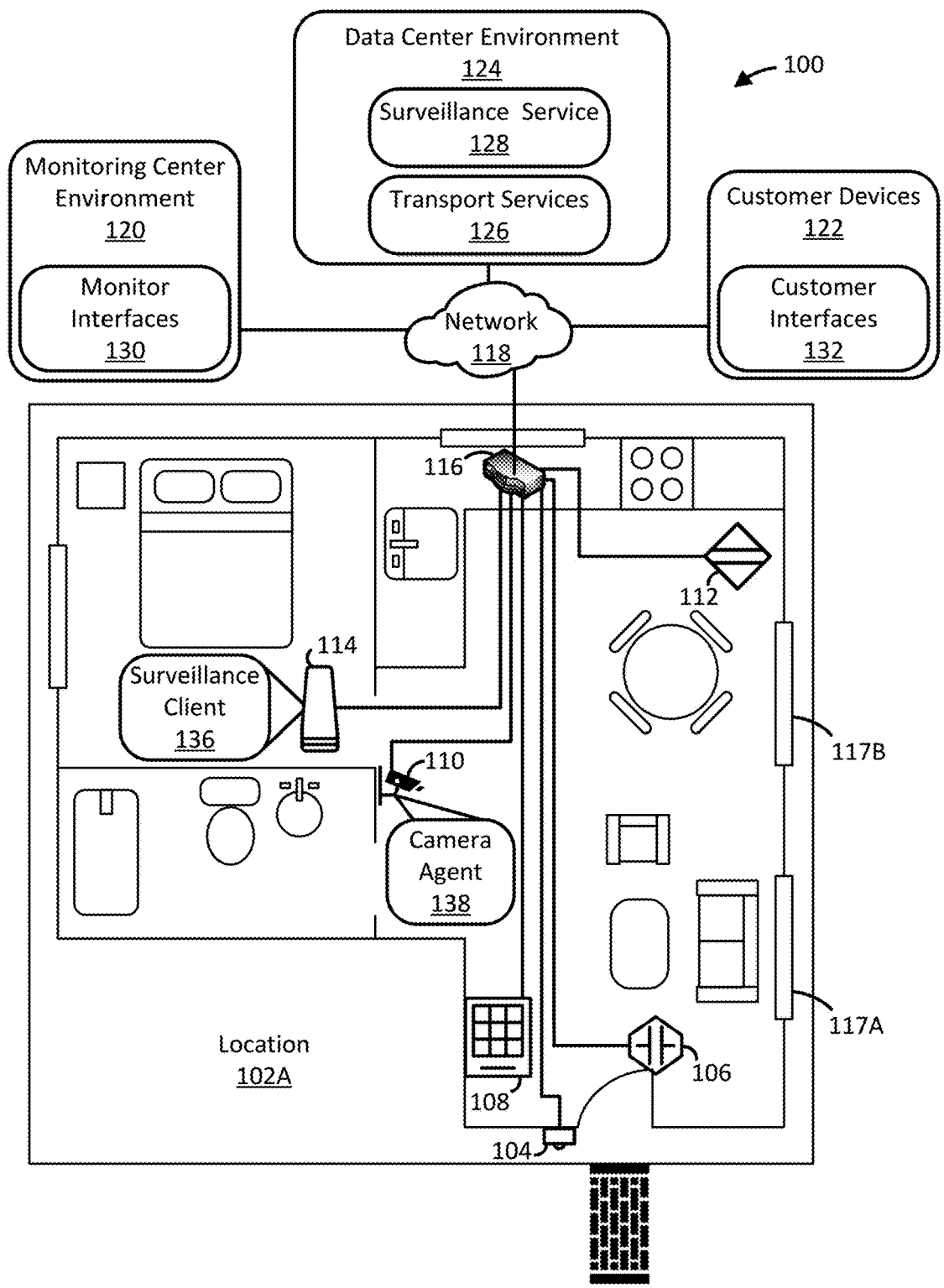
FIG. 1 is a schematic diagram of a security system, according to some examples described herein.

As summarized above, at least some examples disclosed herein are directed to systems and processes that establish communication sessions between one or more security devices located at a monitored location and a computing device located remotely from the monitored location. These sessions enable a remotely located user (e.g., a monitoring professional or a customer of a security service) to intervene at a monitored location in the event of a reportable event, such as a break-in. To intervene may include, for example, to interact with one or more security devices at the monitored location to adjust the operation of the same and/or to interact with a person at the monitored location. Such remote intervention can quickly clear false alarms or, in some situations, dissuade, deter, or delay theft or other types of harm. Moreover, by allowing a remotely located user to view, hear, and potentially interact with persons at the monitored location, remote interventions supported by communication sessions can help a remotely located user to determine if a dispatch to a monitored location of emergency services and/or law enforcement personnel is warranted. In some examples, the communication sessions described herein enable real time communication between a person at the monitored location and a remotely located user. For instance, in certain examples, the communication sessions enable the person at the monitored location and the remotely located user to converse with minimal perceivable latency (e.g., a latency below 600 milliseconds).

However, concerns exist with implementing remote interventions and the communication sessions that underlie them. For instance, the environment within which a remote intervention is conducted may be chaotic. For instance, where a reportable event has been detected by the one or more security devices at the monitored location, a siren may be active and emitting high volume sound. Moreover, such sound may be coming from multiple sources, if multiple sirens or other security devices capable of emitting sound are installed at the monitored location. If an individual at the monitored location is a customer of the security service or another person with permission to be in the monitored location, this environment is distracting and perhaps even unsettling. Where an individual at the monitored location is an intruder, the environment may be expected but it is likely still to distract the intruder or cause the intruder to focus attention on the goals of the break-in rather than potential interactions with others. Regardless, some environments within which remote interventions may be conducted are not conducive to interaction between the remotely located user and the individual at the monitored location.

There are also concerns regarding customer privacy and resource conservation pertinent to establishing and maintaining a communication session in support of a remote intervention. Some customers may seek documented administrative controls and other assurances that the security devices within their property are not used for purposes other than provision of security services. The privacy concern is particularly strong where the security devices involved in a remote intervention reside within a customer's home. Moreover, establishment and maintenance of communication sessions draw on power and network resources at the monitored location due to the increased processor, camera, speaker, microphone, and (in the case of security devices with wireless network connections) radio usage. The power usage concern is especially poignant where any of the one or more security devices at the monitored location are battery powered.

To address the concerns described above, as well as other concerns, the systems and processes described herein autonomously prepare security devices for effective and controlled remote interventions and the communications sessions that support them. This autonomous preparation can include initiation of programs that garner the attention of individuals within a monitored location through adjustments to, and output from, security devices installed at the monitored location. In some examples, the output from the security devices is rendered by one or more user interfaces incorporated into the security devices. The adjustments can include, for example, silencing and/or lowering active sirens at the monitored location to decrease distractions. The device output used to garner the attention of the individual can include visual indications and audio cues. The autonomous preparation can further include initiation of programs that monitor, record, and limit remote interventions to be published to the customer for complete transparency as to the actions taken during a remote intervention. In some examples, the autonomous preparation begins prior to establishment of the communication session (e.g., a real time communication session) underlying a remote intervention. As such, in at least some examples, the benefits of the autonomous preparation described herein are realized very early within a remote intervention (e.g., before a remote user can even access security devices at the monitored location).

Whereas various examples are described herein, it will be apparent to those of ordinary skill in the art that many more examples and implementations are possible. Accordingly, the examples described herein are not the only possible examples and implementations. Furthermore, the advantages described above are not necessarily the only advantages, and it is not necessarily expected that all of the described advantages will be achieved with every example.

For the purposes of promoting an understanding of the principles of the present disclosure, reference will now be made to the examples illustrated in the drawings, and specific language will be used to describe the same. It will nevertheless be understood that no limitation of the scope of the examples described herein is thereby intended.

FIG. 1 is a schematic diagram of a security system 100 configured to monitor geographically disparate locations in accordance with some examples. As shown in FIG. 1, the system 100 includes a monitored location 102A, a monitoring center environment 120, a data center environment 124, one or more customer devices 122, and a communication network 118. Each of the monitored location 102A, the monitoring center 120, the data center 124, the one or more customer devices 122, and the communication network 118 include one or more computing devices (e.g., as described below with reference to FIG. 13). The one or more customer devices 122 are configured to host one or more customer interface applications 132. The monitoring center environment 120 is configured to host one or more monitor interface applications 130. The data center environment 124 is configured to host a surveillance service 128 and one or more transport services 126. The location 102A includes image capture devices 104 and 110, a contact sensor assembly 106, a keypad 108, a motion sensor assembly 112, a base station 114, and a router 116. The base station 114 hosts a surveillance client 136. The image capture device 110 hosts a camera agent 138. The security devices disposed at the location 102A (e.g., devices 104, 106, 108, 110, 112, and 114) may be referred to herein as location-based devices.

In some examples, the router 116 is a wireless router that is configured to communicate with the location-based devices via communications that comport with a communications standard such as any of the various Institute of Electrical and Electronics Engineers (IEEE) 802.11 standards. As illustrated in FIG. 1, the router 116 is also configured to communicate with the network 118. It should be noted that the router 116 implements a local area network (LAN) within and proximate to the location 102A by way of example only. Other networking technology that involves other computing devices is suitable for use within the location 102A. For instance, in some examples, the base station 114 can receive and forward communication packets transmitted by the image capture device 110 via a point-to-point personal area network (PAN) protocol, such as BLUETOOTH. Other wired, wireless, and mesh network technology and topologies will be apparent with the benefit of this disclosure and are intended to fall within the scope of the examples disclosed herein.

Continuing with the example of FIG. 1, the network 118 can include one or more public and/or private networks that support, for example, IP. The network 118 may include, for example, one or more LANs, one or more PANs, and/or one or more wide area networks (WANs). The LANs can include wired or wireless networks that support various LAN standards, such as a version of IEEE 802.11 and the like. The PANs can include wired or wireless networks that support various PAN standards, such as BLUETOOTH, ZIGBEE, and the like. The WANs can include wired or wireless networks that support various WAN standards, such as the Code Division Multiple Access (CDMA) radio standard, the Global System for Mobiles (GSM) radio standard, and the like. The network 118 connects and enables data communication between the computing devices within the location 102A, the monitoring center environment 120, the data center environment 124, and the customer devices 122. In at least some examples, both the monitoring center environment 120 and the data center environment 124 include network equipment (e.g., similar to the router 116) that is configured to communicate with the network 118 and computing devices collocated with or near the network equipment. It should be noted that, in some examples, the network 118 and the network extant within the location 102A support other communication protocols, such as MQTT or other IoT protocols.

Continuing with the example of FIG. 1, the data center environment 124 can include physical space, communications, cooling, and power infrastructure to support networked operation of computing devices. For instance, this infrastructure can include rack space into which the computing devices are installed, uninterruptible power supplies, cooling plenum and equipment, and networking devices. The data center environment 124 can be dedicated to the security system 100, can be a non-dedicated, commercially available cloud computing service (e.g., MICROSOFT AZURE, AMAZON WEB SERVICES, GOOGLE CLOUD, or the like), or can include a hybrid configuration made up of dedicated and non-dedicated resources. Regardless of its physical or logical configuration, as shown in FIG. 1, the data center environment 124 is configured to host the surveillance service 128 and the transport services 126.

Continuing with the example of FIG. 1, the monitoring center environment 120 can include a plurality of computing devices (e.g., desktop computers) and network equipment (e.g., one or more routers) connected to the computing devices and the network 118. The customer devices 122 can include personal computing devices (e.g., a desktop computer, laptop, tablet, smartphone, or the like) and network equipment (e.g., a router, cellular modem, cellular radio, or the like). As illustrated in FIG. 1, the monitoring center environment 120 is configured to host the monitor interfaces 130 and the customer devices 122 are configured to host the customer interfaces 132.

Continuing with the example of FIG. 1, the devices 104, 106, 110, and 112 are configured to acquire analog signals via sensors incorporated into the devices, generate digital sensor data based on the acquired signals, and communicate (e.g. via a wireless link with the router 116) the sensor data to the base station 114. The type of sensor data generated and communicated by these devices varies along with the type of sensors included in the devices. For instance, the image capture devices 104 and 110 can acquire ambient light, generate frames of image data based on the acquired light, and communicate the frames to the base station 114, the monitor interfaces 130, and/or the customer interfaces 132, although the pixel resolution and frame rate may vary depending on the capabilities of the devices. As shown in FIG. 1, the image capture device 104 has a field of view (FOV) that originates proximal to a front door of the location 102A and can acquire images of a walkway, highway, and a space between the location 102A and the highway. The image capture device 110 has an FOV that originates proximal to a bathroom of the location 102A and can acquire images of a living room and dining area of the location 102A. The image capture device 110 can further acquire images of outdoor areas beyond the location 102A through windows 117A and 117B on the right side of the location 102A.

Further, as shown in FIG. 1, in some examples the image capture device 110 is configured to communicate with the surveillance service 128, the monitor interfaces 130, and the customer interfaces 132 separately from the surveillance client 136 via execution of the camera agent 138. These communications can include sensor data generated by the image capture device 110 and/or commands to be executed by the image capture device 110 sent by the surveillance service 128, the monitor interfaces 130, and/or the customer interfaces 132. The commands can include, for example, requests for interactive communication sessions in which monitoring personnel and/or customers interact with the image capture device 110 via the monitor interfaces 130 and the customer interfaces 132. These interactions can include requests for the image capture device 110 to transmit additional sensor data and/or requests for the image capture device 110 to render output via a user interface (e.g., the user interface 412 of FIG. 4B). This output can include audio and/or video output.

Continuing with the example of FIG. 1, the contact sensor assembly 106 includes a sensor that can detect the presence or absence of a magnetic field generated by a magnet when the magnet is proximal to the sensor. When the magnetic field is present, the contact sensor assembly 106 generates Boolean sensor data specifying a closed state. When the magnetic field is absent, the contact sensor assembly 106 generates Boolean sensor data specifying an open state. In either case, the contact sensor assembly 106 can communicate sensor data indicating whether the front door of the location 102A is open or closed to the base station 114. The motion sensor assembly 112 can include an audio emission device that can radiate sound (e.g., ultrasonic) waves and an audio sensor that can acquire reflections of the waves. When the audio sensor detects the reflection because no objects are in motion within the space monitored by the audio sensor, the motion sensor assembly 112 generates Boolean sensor data specifying a still state. When the audio sensor does not detect a reflection because an object is in motion within the monitored space, the motion sensor assembly 112 generates Boolean sensor data specifying an alert state. In either case, the motion sensor assembly 112 can communicate the sensor data to the base station 114. It should be noted that the specific sensing modalities described above are not limiting to the present disclosure. For instance, as one of many potential examples, the motion sensor assembly 112 can base its operation on acquisition of changes in temperature rather than changes in reflected sound waves.

Continuing with the example of FIG. 1, the keypad 108 is configured to interact with a user and interoperate with the other location-based devices in response to interactions with the user. For instance, in some examples, the keypad 108 is configured to receive input from a user that specifies one or more commands and to communicate the specified commands to one or more addressed processes. These addressed processes can include processes implemented by one or more of the location-based devices and/or one or more of the monitor interfaces 130 or the surveillance service 128. The commands can include, for example, codes that authenticate the user as a resident of the location 102A and/or codes that request activation or deactivation of one or more of the location-based devices. Alternatively or additionally, in some examples, the keypad 108 includes a user interface (e.g., a tactile interface, such as a set of physical buttons or a set of virtual buttons on a touchscreen) configured to interact with a user (e.g., receive input from and/or render output to the user). Further still, in some examples, the keypad 108 can receive and respond to the communicated commands and render the responses via the user interface as visual or audio output.

Continuing with the example of FIG. 1, the base station 114 is configured to interoperate with the other location-based devices to provide local command and control and store-and-forward functionality via execution of the surveillance client 136. In some examples, to implement store-and-forward functionality, the base station 114, through execution of the surveillance client 136, receives sensor data, packages the data for transport, and stores the packaged sensor data in local memory for subsequent communication. This communication of the packaged sensor data can include, for instance, transmission of the packaged sensor data as a payload of a message to one or more of the transport services 126 when a communication link to the transport services 126 via the network 118 is operational. In some examples, packaging the sensor data can include filtering the sensor data and/or generating one or more summaries (maximum values, minimum values, average values, changes in values since the previous communication of the same, etc.) of multiple sensor readings. To implement local command and control functionality, the base station 114 executes, under control of the surveillance client 136, a variety of programmatic operations in response to various events. Examples of these events can include reception of commands from the keypad 108 or the customer interface application 132, reception of commands from one of the monitor interfaces 130 or the customer interface application 132 via the network 118, or detection of the occurrence of a scheduled event. The programmatic operations executed by the base station 114 under control of the surveillance client 136 can include activation or deactivation of one or more of the devices 104, 106, 108, 110, and 112; sounding of an alarm; reporting an event to the surveillance service 128; and communicating location data to one or more of the transport services 126 to name a few operations. The location data can include data specifying sensor readings (sensor data), configuration data of any of the location-based devices, commands input and received from a user (e.g., via the keypad 108 or a customer interface 132), or data derived from one or more of these data types (e.g., filtered sensor data, summarizations of sensor data, event data specifying an event detected at the location via the sensor data, etc).

Continuing with the example of FIG. 1, the transport services 126 are configured to securely, reliably, and efficiently exchange messages between processes implemented by the location-based devices and processes implemented by other devices in the system 100. These other devices can include the customer devices 122, devices disposed in the data center environment 124, and/or devices disposed in the monitoring center environment 120. In some examples, the transport services 126 are also configured to parse messages from the location-based devices to extract payloads included therein and store the payloads and/or data derived from the payloads within one or more data stores hosted in the data center environment 124. The data housed in these data stores may be subsequently accessed by, for example, the surveillance service 128, the monitor interfaces 130, and the customer interfaces 132.

In certain examples, the transport services 126 expose and implement one or more application programming interfaces (APIs) that are configured to receive, process, and respond to calls from processes (e.g., the surveillance client 136) implemented by base stations (e.g., the base station 114) and/or processes (e.g., the camera agent 138) implemented by other devices (e.g., the image capture device 110). Individual instances of a transport service within the transport services 126 can be associated with and specific to certain manufactures and models of location-based monitoring equipment (e.g., SIMPLISAFE equipment, RING equipment, etc.). The APIs can be implemented using a variety of architectural styles and interoperability standards. For instance, in one example, the API is a web services interface implemented using a representational state transfer (REST) architectural style. In this example, API calls are encoded in Hypertext Transfer Protocol (HTTP) along with JavaScript Object Notation (JSON) and/or extensible markup language (XML). These API calls are addressed to one or more uniform resource locators (URLs) that are API endpoints monitored by the transport services 126. In some examples, portions of the HTTP communications are encrypted to increase security. Alternatively or additionally, in some examples, the API is implemented as an MQTT broker that receives messages and transmits responsive messages to MQTT clients hosted by the base stations and/or the other devices. Alternatively or additionally, in some examples, the API is implemented using simple file transfer protocol commands. Thus, the transport services 126 are not limited to a particular protocol or architectural style. It should be noted that, in at least some examples, the transport services 126 can transmit one or more API calls to location-based devices to request data from, or an interactive communication session with, the location-based devices. One example of the transport services 126 that includes processes that implement communication sessions between location-based devices and devices located remotely from the location 102A are further described below with reference to FIGS. 7 through 12.

Continuing with the example of FIG. 1, the surveillance service 128 is configured to control overall logical setup and operation of the system 100. As such, the surveillance service 128 can interoperate with the transport services 126, the monitor interfaces 130, the customer interfaces 132, and any of the location-based devices. In some examples, the surveillance service 128 is configured to monitor data from a variety of sources for reportable events (e.g., a break-in event) and, when a reportable event is detected, notify one or more of the monitor interfaces 130 and/or the customer interfaces 132 of the reportable event. In some examples, the surveillance service 128 is also configured to maintain state information regarding the location 102A. This state information can indicate, for instance, whether the location 102A is safe or under threat. In certain examples, the surveillance service 128 is configured to change the state information to indicate that the location 102A is safe only upon receipt of a communication indicating a clear event (e.g., rather than making such a change in response to discontinuation of reception of break-in events). This feature can prevent a "crash and smash" robbery from being successfully executed. Further example processes that the surveillance service 128 is configured to execute are described below with reference to FIGS. 5 and 6.

Continuing with the example of FIG. 1, individual monitor interfaces 130 are configured to control computing device interaction with monitoring personnel and to execute a variety of programmatic operations in response to the interactions. For instance, in some examples, the monitor interface 130 controls its host device to provide information regarding reportable events detected at monitored locations, such as the location 102A, to monitoring personnel. Such events can include, for example, movement or an alert condition generated by one or more of the location-based devices. Alternatively or additionally, in some examples, the monitor interface 130 controls its host device to interact with a user to configure features of the system 100. Further example processes that the monitor interface 130 is configured to execute are described below with reference to FIG. 6.

Continuing with the example of FIG. 1, individual customer interfaces 132 are configured to control computing device interaction with a customer and to execute a variety of programmatic operations in response to the interactions. For instance, in some examples, the customer interface 132 controls its host device to provide information regarding reportable events detected at monitored locations, such as the location 102A, to the customer. Such events can include, for example, an alert condition generated by one or more of the location-based devices. Alternatively or additionally, in some examples, the customer interface 132 is configured to process input received from the customer to activate or deactivate one or more of the location-based devices. Further still, in some examples, the customer interface 132 configures features of the system 100 in response to input from a user. Further example processes that the customer interface 132 is configured to execute are described below with reference to FIG. 6.

Figures 2, 3:
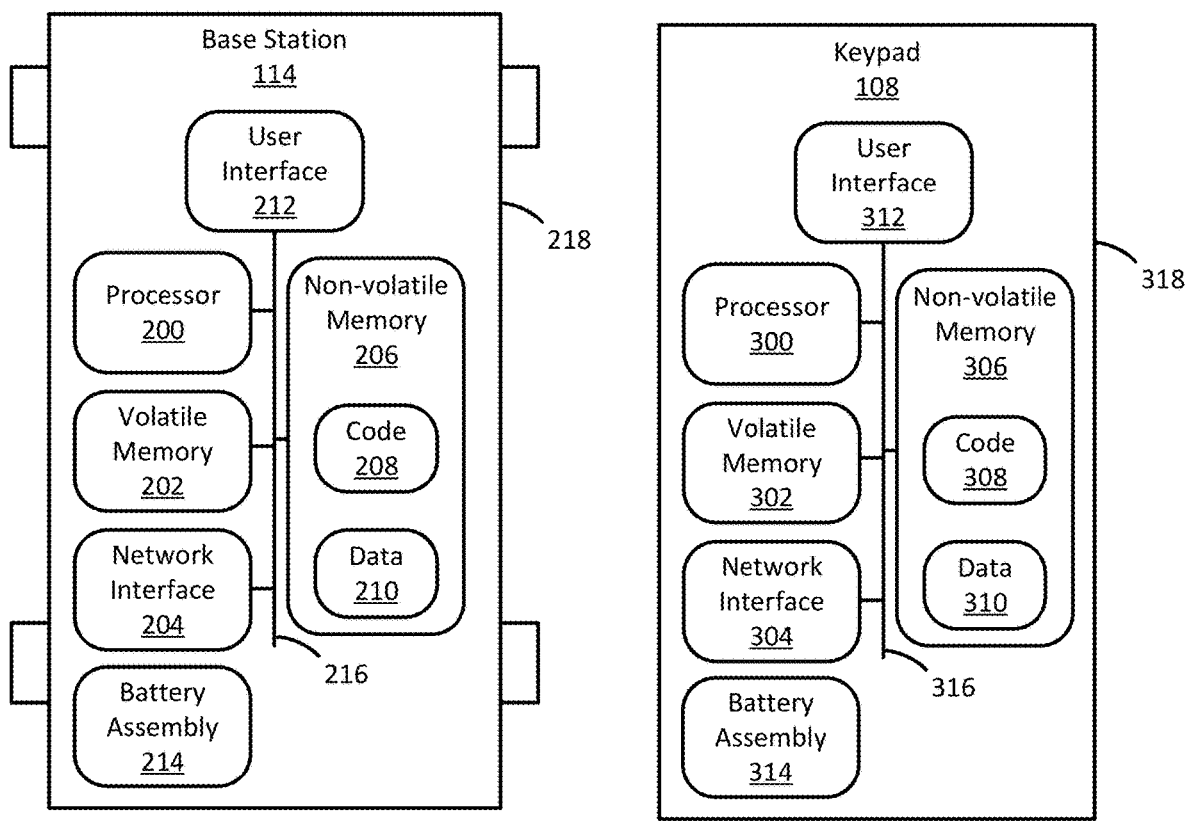
FIG. 2 is a schematic diagram of a base station, according to some examples described herein.
FIG. 3 is a schematic diagram of a keypad, according to some examples described herein.

Turning now to FIG. 2, an example base station 114 is schematically illustrated. As shown in FIG. 2, the base station 114 includes at least one processor 200, volatile memory 202, non-volatile memory 206, at least one network interface 204, a user interface 212, a battery assembly 214, and an interconnection mechanism 216. The non-volatile memory 206 stores executable code 208 and includes a data store 210. In some examples illustrated by FIG. 2, the features of the base station 114 enumerated above are incorporated within, or are a part of, a housing 218.

In some examples, the non-volatile (non-transitory) memory 206 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 208 stored in the non-volatile memory can include an operating system and one or more applications or programs that are configured to execute under the operating system. Alternatively or additionally, the code 208 can include specialized firmware and embedded software that is executable without dependence upon a commercially available operating system. Regardless, execution of the code 208 can implement the surveillance client 136 of FIG. 1 and can result in manipulated data that is a part of the data store 210.

Continuing the example of FIG. 2, the processor 200 can include one or more programmable processors to execute one or more executable instructions, such as a computer program specified by the code 208, to control the operations of the base station 114. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 202) and executed by the circuitry. In some examples, the processor 200 is a digital processor, but the processor 200 can be analog, digital, or mixed. As such, the processor 200 can execute the function, operation, or sequence of operations using digital values and/or using analog signals. In some examples, the processor 200 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 200 that are multicore can provide functionality for parallel, simultaneous execution of instructions or for parallel, simultaneous execution of one instruction on more than one piece of data.

Continuing with the example of FIG. 2, prior to execution of the code 208 the processor 200 can copy the code 208 from the non-volatile memory 206 to the volatile memory 202. In some examples, the volatile memory 202 includes one or more static or dynamic random access memory (RAM) chips and/or cache memory (e.g. memory disposed on a silicon die of the processor 200). Volatile memory 202 can offer a faster response time than a main memory, such as the non-volatile memory 206.

Through execution of the code 208, the processor 200 can control operation of the network interface 204. For instance, in some examples, the network interface 204 includes one or more physical interfaces (e.g., a radio, an ethernet port, a universal serial bus (USB) port, etc.) and a software stack including drivers and/or other code 208 that is configured to communicate with the one or more physical interfaces to support one or more LAN, PAN, and/or WAN standard communication protocols. The communication protocols can include, for example, transmission control protocol (TCP), user datagram protocol (UDP), HTTP, and MQTT among others. As such, the network interface 204 enables the base station 114 to access and communicate with other computing devices (e.g., the location-based devices) via a computer network (e.g., the LAN established by the router 116 of FIG. 1, the network 118 of FIG. 1, and/or a point-to-point connection). For instance, in at least one example, the network interface 204 utilizes sub-GHz wireless networking to transmit wake messages to the other computing devices to request streams of sensor data or other operations. Use of sub-GHz wireless networking can improve operable communication distances and/or reduce power consumed to communicate.

Through execution of the code 208, the processor 200 can control operation of the user interface 212. For instance, in some examples, the user interface 212 includes user input and/or output devices (e.g., a keyboard, a mouse, a touchscreen, a display, a speaker, a camera, an accelerometer, a biometric scanner, an environmental sensor, etc.) and a software stack including drivers and/or other code 208 that is configured to communicate with the user input and/or output devices. For instance, the user interface 212 can be implemented by a customer device 122 hosting a mobile application (e.g., a customer interface 132). The user interface 212 enables the base station 114 to interact with users to receive input and/or render output. This rendered output can include, for instance, one or more graphical user interfaces (GUIs) including one or more controls configured to display output and/or receive input. The input can specify values to be stored in the data store 210. The output can indicate values stored in the data store 210. It should be noted that, in some examples, parts of the user interface 212 are accessible and/or visible as part of, or through, the housing 218. These parts of the user interface 212 can include, for example, one or more light-emitting diodes (LEDs). Alternatively or additionally, in some examples, the user interface 212 includes a 95 db siren that the processor 200 sounds to indicate that a break-in event has been detected.

Continuing with the example of FIG. 2, the various features of the base station 114 described above can communicate with one another via the interconnection mechanism 216. In some examples, the interconnection mechanism 216 includes a communications bus. In addition, in some examples, the battery assembly 214 is configured to supply operational power to the various features of the base station 114 described above. In some examples, the battery assembly 214 includes at least one rechargeable battery (e.g., one or more NiMH or lithium batteries). In some examples, the rechargeable battery has a runtime capacity sufficient to operate the base station 114 for 24 hours or longer while the base station 114 is disconnected from or otherwise not receiving line power. Alternatively or additionally, in some examples, the battery assembly 214 includes power supply circuitry to receive, condition, and distribute line power to both operate the base station 114 and recharge the rechargeable battery. The power supply circuitry can include, for example, a transformer and a rectifier, among other circuitry, to convert AC line power to DC device and recharging power.

Turning now to FIG. 3, an example keypad 108 is schematically illustrated. As shown in FIG. 3, the keypad 108 includes at least one processor 300, volatile memory 302, non-volatile memory 306, at least one network interface 304, a user interface 312, a battery assembly 314, and an interconnection mechanism 316. The non-volatile memory 306 stores executable code 308 and a data store 310. In some examples illustrated by FIG. 3, the features of the keypad 108 enumerated above are incorporated within, or are a part of, a housing 318.

In some examples, the respective descriptions of the processor 200, the volatile memory 202, the non-volatile memory 206, the interconnection mechanism 216, and the battery assembly 214 with reference to the base station 114 are applicable to the processor 300, the volatile memory 302, the non-volatile memory 306, the interconnection mechanism 316, and the battery assembly 314 with reference to the keypad 108. As such, those descriptions will not be repeated.

Continuing with the example of FIG. 3, through execution of the code 308, the processor 300 can control operation of the network interface 304. In some examples, the network interface 304 includes one or more physical interfaces (e.g., a radio, an ethernet port, a USB port, etc.) and a software stack including drivers and/or other code 308 that is configured to communicate with the one or more physical interfaces to support one or more LAN, PAN, and/or WAN standard communication protocols. These communication protocols can include, for example, TCP, UDP, HTTP, and MQTT among others. As such, the network interface 304 enables the keypad 108 to access and communicate with other computing devices (e.g., the other location-based devices) via a computer network (e.g., the LAN established by the router 116 and/or a point-to-point connection).

Continuing with the example of FIG. 3, through execution of the code 308, the processor 300 can control operation of the user interface 312. In some examples, the user interface 312 includes user input and/or output devices (e.g., physical keys arranged as a keypad, a touchscreen, a display, a speaker, a camera, a biometric scanner, an environmental sensor, etc.) and a software stack including drivers and/or other code 308 that is configured to communicate with the user input and/or output devices. As such, the user interface 312 enables the keypad 108 to interact with users to receive input and/or render output. This rendered output can include, for instance, one or more GUIs including one or more controls configured to display output and/or receive input. The input can specify values to be stored in the data store 310. The output can indicate values stored in the data store 310. It should be noted that, in some examples, parts of the user interface 312 (e.g., one or more LEDs) are accessible and/or visible as part of, or through, the housing 318.

Figure 4A:
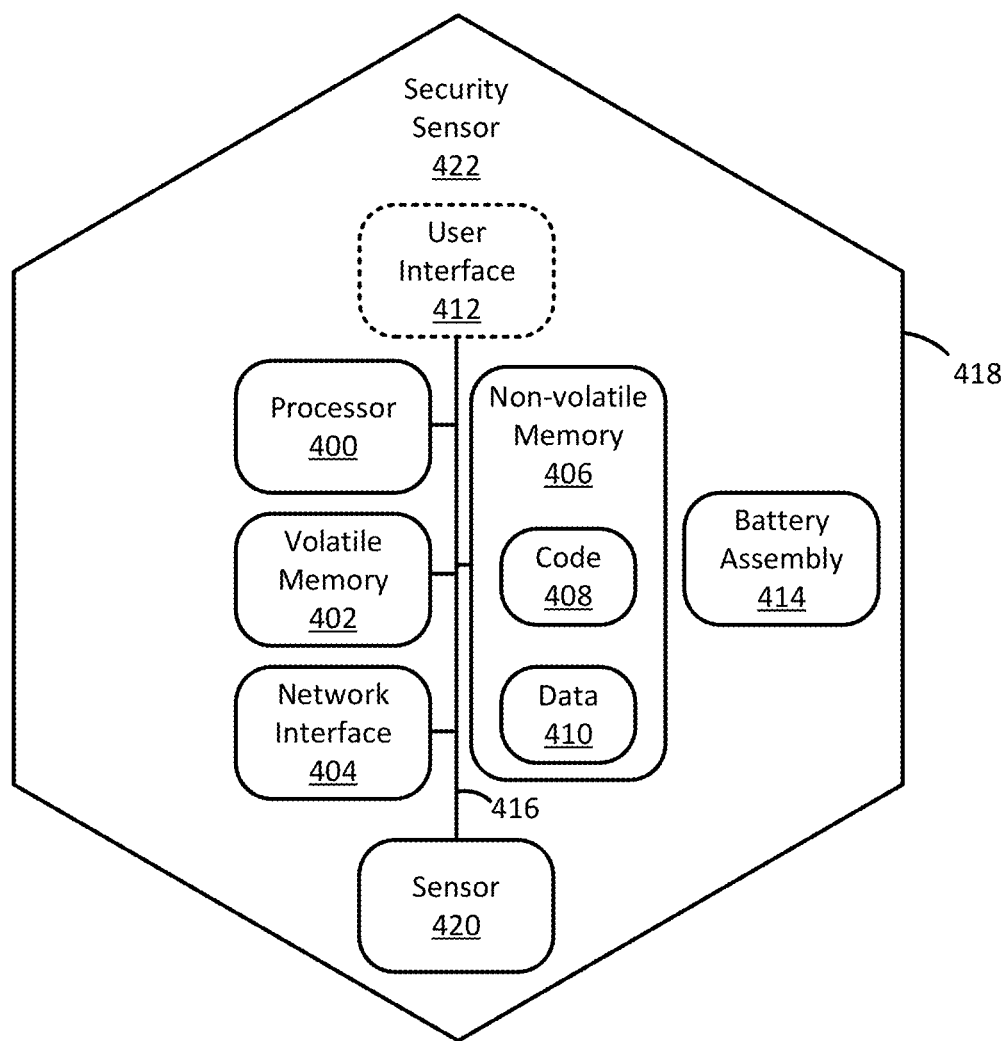
FIG. 4A is a schematic diagram of a security sensor, according to some examples described herein.

Turning now to FIG. 4A, an example security sensor 422 is schematically illustrated. Particular configurations of the security sensor 422 (e.g., the image capture devices 104 and 110, the motion sensor assembly 112, and the contact sensor assemblies 106) are illustrated in FIG. 1 and described above. As shown in FIG. 4A, the security sensor 422 includes at least one processor 400, volatile memory 402, non-volatile memory 406, at least one network interface 404, a battery assembly 414, an interconnection mechanism 416, and at least one sensor assembly 420. The non-volatile memory 406 stores executable code 408 and a data store 410. Some examples include a user interface 412. In certain examples illustrated by FIG. 4A, the features of the security sensor 422 enumerated above are incorporated within, or are a part of, a housing 418.

In some examples, the respective descriptions of the processor 200, the volatile memory 202, the non-volatile memory 206, the interconnection mechanism 216, and the battery assembly 214 with reference to the base station 114 are applicable to the processor 400, the volatile memory 402, the non-volatile memory 406, the interconnection mechanism 416, and the battery assembly 414 with reference to the security sensor 422. As such, those descriptions will not be repeated.

Continuing with the example of FIG. 4A, through execution of the code 408, the processor 400 can control operation of the network interface 404. In some examples, the network interface 404 includes one or more physical interfaces (e.g., a radio (including an antenna), an ethernet port, a USB port, etc.) and a software stack including drivers and/or other code 408 that is configured to communicate with the one or more physical interfaces to support one or more LAN, PAN, and/or WAN standard communication protocols. The communication protocols can include, for example, TCP, UDP, HTTP, and MQTT among others. As such, the network interface 404 enables the security sensor 422 to access and communicate with other computing devices (e.g., the other location-based devices) via a computer network (e.g., the LAN established by the router 116 and/or a point-to-point connection). For instance, in at least one example, when executing the code 408, the processor 400 controls the network interface to stream (e.g., via UDP) sensor data acquired from the sensor assembly 420 to the base station 114. Alternatively or additionally, in at least one example, through execution of the code 408, the processor 400 can control the network interface 404 to enter a power conservation mode by powering down a 2.4 GHz radio and powering up a sub-GHz radio that are both included in the network interface 404. In this example, through execution of the code 408, the processor 400 can control the network interface 404 to enter a streaming or interactive mode by powering up a 2.4 GHz radio and powering down a sub-GHz radio, for example, in response to receiving a wake signal from the base station via the sub-GHz radio.

Continuing with the example of FIG. 4A, through execution of the code 408, the processor 400 can control operation of the user interface 412. In some examples, the user interface 412 includes user input and/or output devices (e.g., physical buttons, a touchscreen, a display, a speaker, a camera, an accelerometer, a biometric scanner, an environmental sensor, one or more LEDs, etc.) and a software stack including drivers and/or other code 408 that is configured to communicate with the user input and/or output devices. As such, the user interface 412 enables the security sensor 422 to interact with users to receive input and/or render output. This rendered output can include, for instance, one or more GUIs including one or more controls configured to display output and/or receive input. The input can specify values to be stored in the data store 410. The output can indicate values stored in the data store 410. It should be noted that, in some examples, parts of the user interface 412 are accessible and/or visible as part of, or through, the housing 418.

Continuing with the example of FIG. 4A, the sensor assembly 420 can include one or more types of sensors, such as the sensors described above with reference to the image capture devices 104 and 110, the motion sensor assembly 112, and the contact sensor assembly 106 of FIG. 1, or other types of sensors. For instance, in at least one example, the sensor assembly 420 includes an image sensor (e.g., a charge-coupled device or an active-pixel sensor) and a temperature or thermographic sensor (e.g., an active and/or passive infrared (PIR) sensor). Regardless of the type of sensor or sensors housed, the processor 400 can (e.g., via execution of the code 408) acquire sensor data from the housed sensor and stream the acquired sensor data to the processor 400 for communication to the base station.

It should be noted that, in some examples of the devices 108 and 422, the operations executed by the processors 300 and 400 while under control of respective control of the code 308 and 408 may be hardcoded and/or implemented in hardware, rather than as a combination of hardware and software. Moreover, execution of the code 408 can implement the camera agent 138 of FIG. 1 and can result in manipulated data that is a part of the data store 410.

Figure 4B:
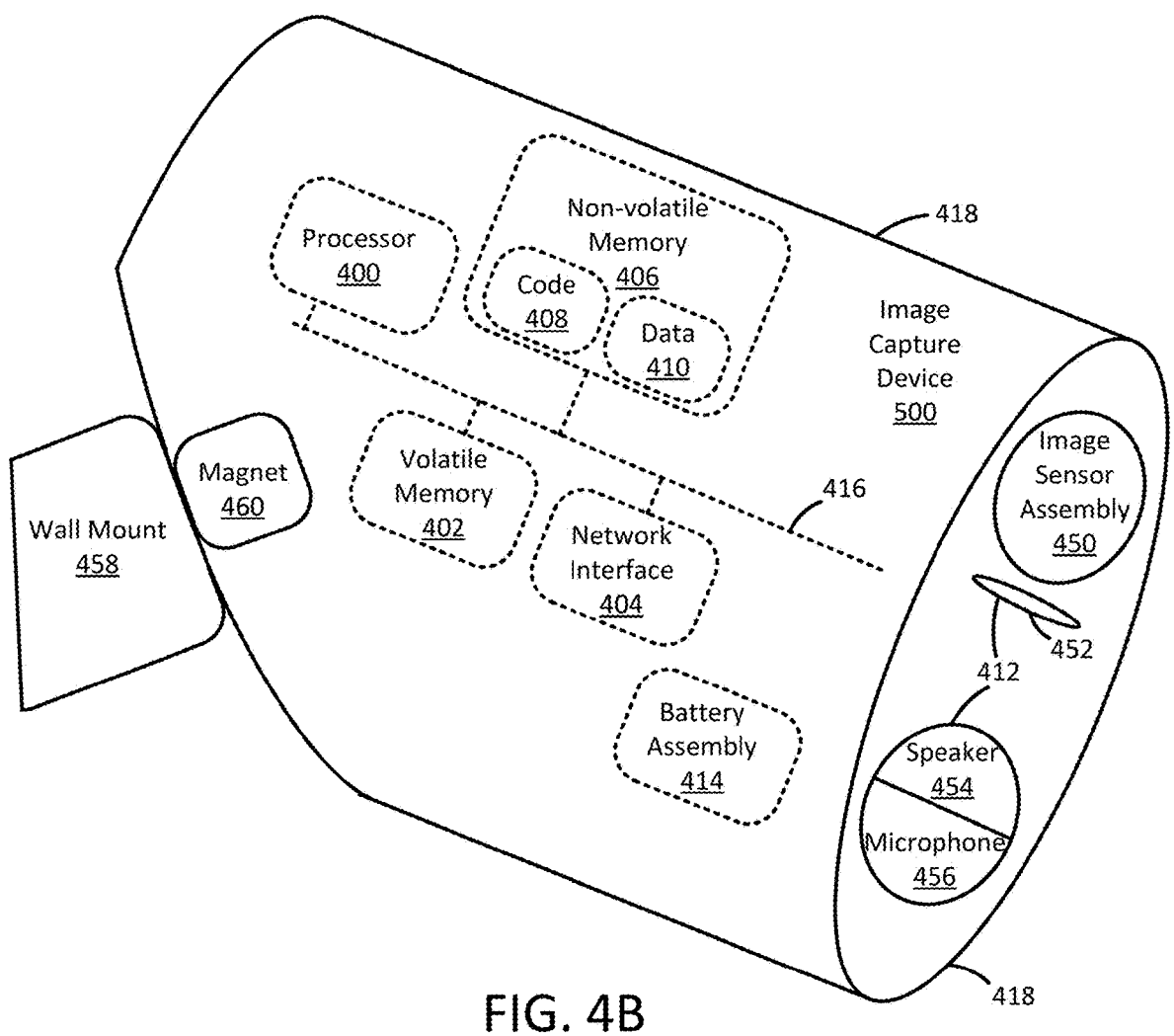
FIG. 4B is a schematic diagram of a security sensor, according to some examples described herein.

Turning now to FIG. 4B, an example image capture device 500 is schematically illustrated. Particular configurations of the image capture device 500 (e.g., the image capture devices 104 and 110) are illustrated in FIG. 1 and described above. As shown in FIG. 4B, the image capture device 500 includes at least one processor 400, volatile memory 402, non-volatile memory 406, at least one network interface 404, a battery assembly 414, and an interconnection mechanism 416. These features of the image capture device are illustrated in dashed lines to indicate that they reside within a housing 418. The non-volatile memory 406 stores executable code 408 and a data store 410.

Some examples further include an image sensor assembly 450, a light 452, a speaker 454, a microphone 456, a wall mount 458, and a magnet 460. The image sensor assembly 450 may include a lens and an image sensor. The light 452 may include a light emitting diode (LED), such as a red-green-blue emitting LED. The light 452 may also include an infrared emitting diode in some examples. The speaker 454 may include a transducer configured to emit sound in the range of 60 dB to 80 dB or louder. Further, in some examples, the speaker 454 can include a siren configured to emit sound in the range of 70 dB to 90 db or louder. The microphone 456 may include a micro electro-mechanical system (MEMS) microphone. The wall mount 458 may include a mounting bracket, configured to accept screws or other fasteners that adhere the bracket to a wall, and a cover configured to mechanically couple to the mounting bracket. In some examples, the cover is composed of a magnetic material, such as aluminum or stainless steel, to enable the magnet 460 to magnetically couple to the wall mount 458, thereby holding the image capture device 500 in place.

In some examples, the respective descriptions of the processor 400, the volatile memory 402, the network interface 404, the non-volatile memory 406, the code 408 with respect to the network interface 404, the interconnection mechanism 416, and the battery assembly 414 with reference to the security sensor 422 are applicable to these same features with reference to the image capture device 500. As such, those descriptions will not be repeated here.

Continuing with the example of FIG. 4B, through execution of the code 408, the processor 400 can control operation of the image sensor assembly 450, the light 452, the speaker 454, and the microphone 456. For instance, in at least one example, when executing the code 408, the processor 400 controls the image sensor assembly 450 to acquire sensor data, in the form of image data, to be streamed to the base station 114 (or one of the processes 130, 128, or 132 of FIG. 1) via the network interface 404. Alternatively or additionally, in at least one example, through execution of the code 408, the processor 400 controls the light 452 to emit light so that the image sensor assembly 450 collects sufficient reflected light to compose the image data. Further, in some examples, through execution of the code 408, the processor 400 controls the speaker 454 to emit sound. This sound may be locally generated (e.g., a sonic alert via the siren) or streamed from the base station 114 (or one of the processes 130, 128 or 132 of FIG. 1) via the network interface 404 (e.g., utterances from the user or monitoring personnel). Further still, in some examples, through execution of the code 408, the processor 400 controls the microphone 456 to acquire sensor data in the form of sound for streaming to the base station 114 (or one of the processes 130, 128 or 132 of FIG. 1) via the network interface 404.

It should be appreciated that in the example of FIG. 4B, the light 452, the speaker 454, and the microphone 456 implement an instance of the user interface 412 of FIG. 4A. It should also be appreciated that the image sensor assembly 450 and the light 452 implement an instance of the sensor assembly 420 of FIG. 4A. As such, the image capture device 500 illustrated in FIG. 4B is at least one example of the security sensor 422 illustrated in FIG. 4A.

Figure 5:
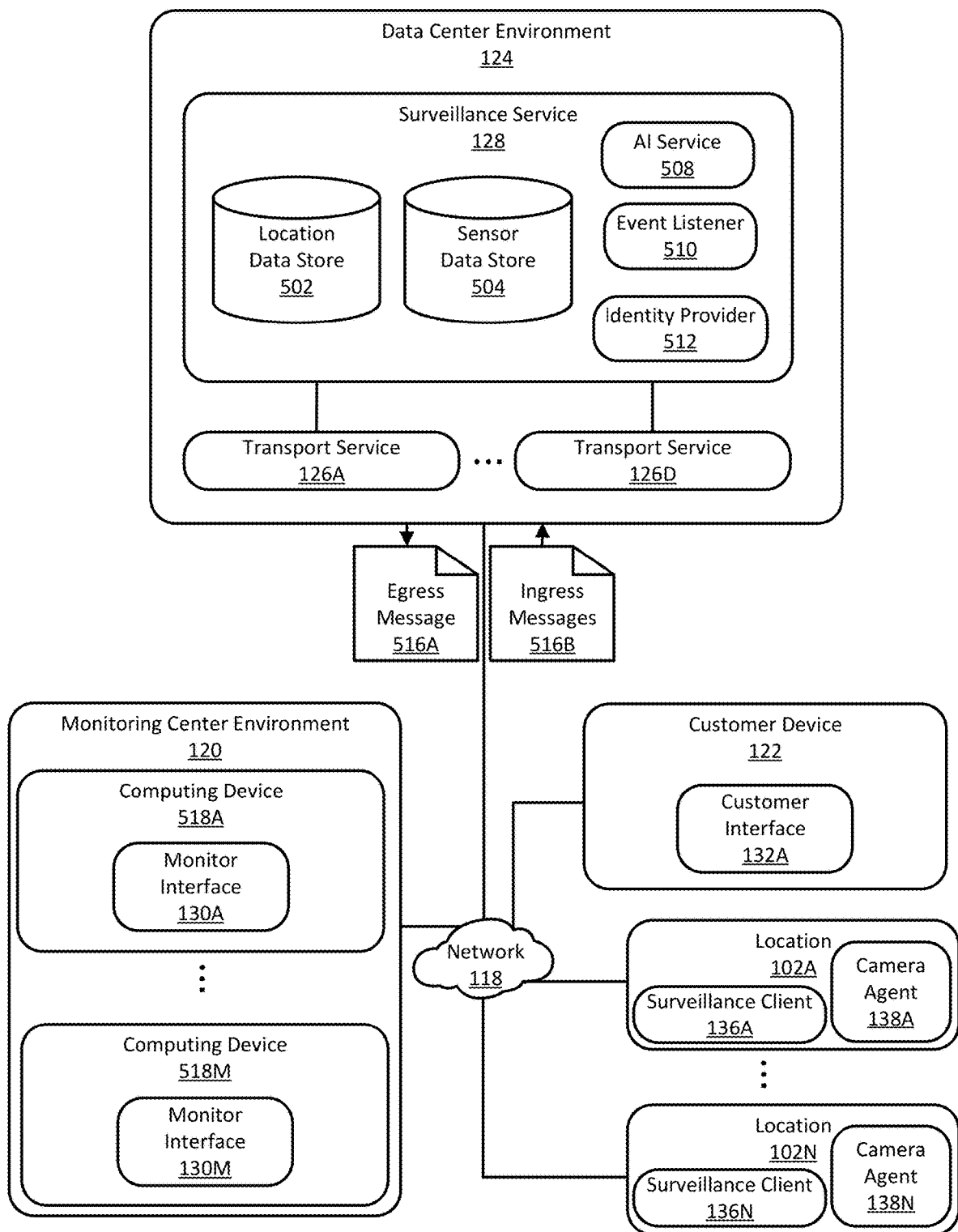
FIG. 5 is a schematic diagram of a data center environment, a monitoring center environment, and a customer device, according to some examples described herein.

Turning now to FIG. 5, aspects of the data center environment 124 of FIG. 1, the monitoring center environment 120 of FIG. 1, one of the customer devices 122 of FIG. 1, the network 118 of FIG. 1, and a plurality of monitored locations 102A of FIG. 1 through 102N (collectively referred to as the locations 102) are schematically illustrated. As shown in FIG. 5, the data center environment 124 hosts the surveillance service 128 and the transport services 126 (individually referred to as the transport services 126A through 126D). The surveillance service 128 includes a location data store 502, a sensor data store 504, an artificial intelligence (AI) service 508, an event listening service 510, and an identity provider 512. The monitoring center environment 120 includes computing devices 518A through 518M (collectively referred to as the computing devices 518) that host monitor interfaces 130A through 130M. Individual locations 102A through 102N include base stations (e.g., the base station 114 of FIG. 1, not shown) that host the surveillance clients 136A through 136N (collectively referred to as the surveillance clients 136) and image capture devices (e.g., the image capture device 110 of FIG. 1, not shown) that host the software camera agents 138A through 138N (collectively referred to as the camera agents 138).

As shown in FIG. 5, the transport services 126 are configured to process ingress messages 516B from the customer interface 132A, the surveillance clients 136, the camera agents 138, and/or the monitor interfaces 130. The transport services 126 are also configured to process egress messages 516A addressed to the customer interface 132A, the surveillance clients 136, the camera agents 138, and the monitor interfaces 130. The location data store 502 is configured to store, within a plurality of records, location data in association with identifiers of customers for whom the location is monitored. For example, the location data may be stored in a record with an identifier of a customer and/or an identifier of the location to associate the location data with the customer and the location. The sensor data store 504 is configured to store, within a plurality of records, sensor data (e.g., one or more frames of image data) in association with identifiers of locations and timestamps at which the sensor data was acquired.

Continuing with the example of FIG. 5, the AI service 508 is configured to process sensor data (e.g., images and/or sequences of images) to identify movement, human faces, and other features within the sensor data. The event listening service 510 is configured to scan location data transported via the ingress messages 516B for events and, where an event is identified, execute one or more event handlers to process the event. In some examples, the event handlers can include an event reporter that is configured to identify reportable events and to communicate messages specifying the reportable events to one or more recipient processes (e.g., a customer interface 132 and/or a monitor interface 130). In some examples, the event listening service 510 can interoperate with the AI service 508 to identify events within sensor data. The identity provider 512 is configured to receive, via the transport services 126, authentication requests from the surveillance clients 136 or the camera agents 138 that include security credentials. When the identity provider 512 can authenticate the security credentials in a request (e.g., via a validation function, cross-reference look-up, or some other authentication process), the identity provider 512 can communicate a security token in response to the request. A surveillance client 136 or a camera agent 138 can receive, store, and include the security token in subsequent ingress messages 516B, so that the transport service 126A is able to securely process (e.g., unpack/parse) the packages included in the ingress messages 516B to extract the location data prior to passing the location data to the surveillance service 128.

Continuing with the example of FIG. 5, the transport services 126 are configured to receive the ingress messages 516B, verify the authenticity of the messages 516B, parse the messages 516B, and extract the location data encoded therein prior to passing the location data to the surveillance service 128 for processing. This location data can include any of the location data described above with reference to FIG. 1. Individual transport services 126 may be configured to process ingress messages 516B generated by location-based monitoring equipment of a particular manufacturer and/or model. The surveillance clients 136 and the camera agents 138 are configured to generate and communicate, to the surveillance service 128 via the network 118, ingress messages 516B that include packages of location data based on sensor information received at the locations 102.

Continuing with the example of FIG. 5, the computing devices 518 are configured to host the monitor interfaces 130. In some examples, individual monitor interfaces 130A-130M are configured to render GUIs including one or more image frames and/or other sensor data. In certain examples, the customer device 122 is configured to host the customer interface 132. In some examples, customer interface 132 is configured to render GUIs including one or more image frames and/or other sensor data. Additional features of the monitor interfaces 130 and the customer interface 132 are described further below with reference to FIG. 6.

Figure 6:
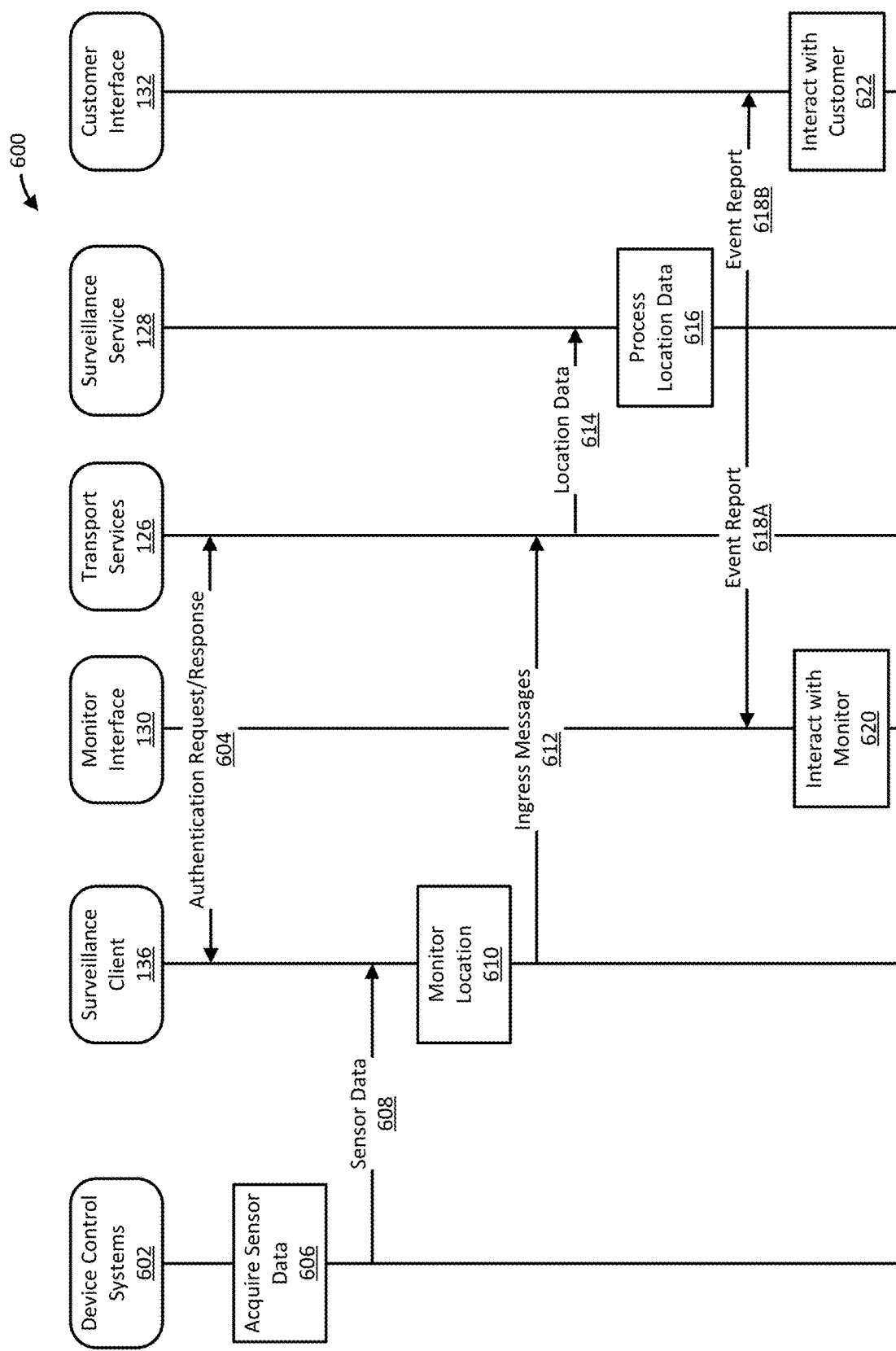
FIG. 6 is a sequence diagram of a monitoring process, according to some examples described herein.

Turning now to FIG. 6, a monitoring process 600 is illustrated as a sequence diagram. The process 600 can be executed, in some examples, by a security system (e.g., the security system 100 of FIG. 1). More specifically, in some examples, at least a portion of the process 600 is executed by the location-based devices under the control of device control system (DCS) code (e.g., either the code 308 or 408) implemented by at least one processor (e.g., either of the processors 300 or 400 of FIG. 3 or 4). The DCS code can include, for example, a camera agent (e.g., the camera agent 138 of FIG. 1). At least a portion of the process 600 is executed by a base station (e.g., the base station 114 of FIG. 1) under control of a surveillance client (e.g., the surveillance client 136 of FIG. 1). At least a portion of the process 600 is executed by a monitoring center environment (e.g., the monitoring center environment 120 of FIG. 1) under control of a monitor interface (e.g., the monitor interface 130 of FIG. 1). At least a portion of the process 600 is executed by a data center environment (e.g., the data center environment 124 of FIG. 1) under control of a surveillance service (e.g., the surveillance service 128 of FIG. 1) or under control of transport services (e.g., the transport services 126 of FIG. 1). At least a portion of the process 600 is executed by a customer device (e.g., the customer device 122 of FIG. 1) under control of a customer interface (e.g., customer interface 132 of FIG. 1).

As shown in FIG. 6, the process 600 starts with the surveillance client 136 authenticating with an identity provider (e.g., the identity provider 512 of FIG. 5) by exchanging one or more authentication requests and responses 604 with the transport service 126. More specifically, in some examples, the surveillance client 136 communicates an authentication request to the transport service 126 via one or more API calls to the transport service 126. In these examples, the transport service 126 parses the authentication request to extract security credentials therefrom and passes the security credentials to the identity provider for authentication. In some examples, if the identity provider authenticates the security credentials, the transport service 126 generates a security token and communicates the security token as a payload within an authentication response to the authentication request. In these examples, if the identity provider is unable to authenticate the security credentials, the transport service 126 generates an error code and communicates the error code as the payload within the authentication response to the authentication request. Upon receipt of the authentication response, the surveillance client 136 parses the authentication response to extract the payload. If the payload includes the error code, the surveillance client 136 can retry authentication and/or interoperate with a user interface of its host device (e.g., the user interface 212 of the base station 114 of FIG. 2) to render output indicating the authentication failure. If the payload includes the security token, the surveillance client 136 stores the security token for subsequent use in communication of location data via ingress messages. It should be noted that the security token can have a limited lifespan (e.g., 1 hour, 1 day, 1 week, 1 month, etc.) after which the surveillance client 136 may be required to reauthenticate with the transport services 126.

Continuing with the process 600, one or more DCSs 602 hosted by one or more location-based devices acquire 606 sensor data descriptive of a location (e.g., the location 102A of FIG. 1). The sensor data acquired can be any of a variety of types, as discussed above with reference to FIGS. 1-4. In some examples, one or more of the DCSs 602 acquire sensor data continuously. In some examples, one or more of the DCSs 602 acquire sensor data in response to an event, such as expiration of a local timer (a push event) or receipt of an acquisition polling signal communicated by the surveillance client 136 (a poll event). In certain examples, one or more of the DCSs 602 stream sensor data to the surveillance client 136 with minimal processing beyond acquisition and digitization. In these examples, the sensor data may constitute a sequence of vectors with individual vector members including a sensor reading and a timestamp. Alternatively or additionally, in some examples, one or more of the DCSs 602 execute additional processing of sensor data, such as generation of one or more summaries of multiple sensor readings. Further still, in some examples, one or more of the DCSs 602 execute sophisticated processing of sensor data. For instance, if the security sensor includes an image capture device, the security sensor may execute image processing routines such as edge detection, motion detection, facial recognition, threat assessment, and reportable event generation.

Continuing with the process 600, the DCSs 602 communicate the sensor data 608 to the surveillance client 136. As with sensor data acquisition, the DCSs 602 can communicate the sensor data 608 continuously or in response to an event, such as a push event (originating with the DCSs 602) or a poll event (originating with the surveillance client 136).

Continuing with the process 600, the surveillance client 136 monitors 610 the location by processing the received sensor data 608. For instance, in some examples, the surveillance client 136 executes one or more image processing routines. These image processing routines may include any of the image processing routines described above with reference to the operation 606. By distributing at least some of the image processing routines between the DCSs 602 and surveillance clients 136, some examples decrease power consumed by battery-powered devices by off-loading processing to line-powered devices. Moreover, in some examples, the surveillance client 136 may execute an ensemble threat detection process that utilizes sensor data 608 from multiple, distinct DCSs 602 as input. For instance, in at least one example, the surveillance client 136 will attempt to corroborate an open state received from a contact sensor with motion and facial recognition processing of an image of a scene including a window to which the contact sensor is affixed. If two or more of the three processes indicate the presence of an intruder, the threat score is increased and or a break-in event is declared, locally recorded, and communicated. Other processing that the surveillance client 136 may execute includes outputting local alerts (e.g., in response to detection of particular events and/or satisfaction of other criteria) and detection of maintenance conditions for location-based devices, such as a need to change or recharge low batteries and/or replace/maintain the devices that host the DCSs 602. Any of the processes described above within the operation 610 may result in the creation of location data that specifies the results of the processes.

Continuing with the process 600, the surveillance client 136 communicates the location data 614 to the surveillance service 128 via one or more ingress messages 612 to the transport services 126. As with sensor data 608 communication, the surveillance client 136 can communicate the location data 614 continuously or in response to an event, such as a push event (originating with the surveillance client 136) or a poll event (originating with the surveillance service 128).

Continuing with the process 600, the surveillance service 128 processes 616 received location data. For instance, in some examples, the surveillance service 128 executes one or more routines described above with reference to the operations 606 and/or 610. Additionally or alternatively, in some examples, the surveillance service 128 calculates a threat score or further refines an existing threat score using historical information associated with the location identified in the location data and/or other locations geographically proximal to the location (e.g., within the same zone improvement plan (ZIP) code). For instance, in some examples, if multiple break-ins have been recorded for the location and/or other locations within the same ZIP code within a configurable time span including the current time, the surveillance service 128 may increase a threat score calculated by a DCS 602 and/or the surveillance client 136. In some examples, the surveillance service 128 determines, by applying a set of rules and criteria to the location data 614, whether the location data 614 includes any reportable events and, if so, communicates an event report 618A and/or 618B to the monitor interface 130 and/or the customer interface 132. A reportable event may be an event of a certain type (e.g., break-in) or an event of a certain type that satisfies additional criteria (e.g., movement within a particular zone combined with a threat score that exceeds a threshold value). The event reports 618A and/or 618B may have a priority based on the same criteria used to determine whether the event reported therein is reportable or may have a priority based on a different set of criteria or rules.

Continuing with the process 600, the monitor interface 130 interacts 620 with monitoring personnel through, for example, one or more GUIs. These GUIs may provide details and context regarding one or more reportable events.

Continuing with the process 600, the customer interface 132 interacts 622 with at least one customer through, for example, one or more GUIs. These GUIs may provide details and context regarding one or more reportable events.

It should be noted that the processing of sensor data and/or location data, as described above with reference to the operations 606, 610, and 616, may be executed by processors disposed within various parts of the system 100. For instance, in some examples, the DCSs 602 execute minimal processing of the sensor data (e.g., acquisition and streaming only) and the remainder of the processing described above is executed by the surveillance client 136 and/or the surveillance service 128. This approach may be helpful to prolong battery runtime of location-based devices. In other examples, the DCSs 602 execute as much of the sensor data processing as possible, leaving the surveillance client 136 and the surveillance service 128 to execute only processes that require sensor data that spans location-based devices and/or locations. This approach may be helpful to increase scalability of the system 100 with regard to adding new locations.

Figure 7:
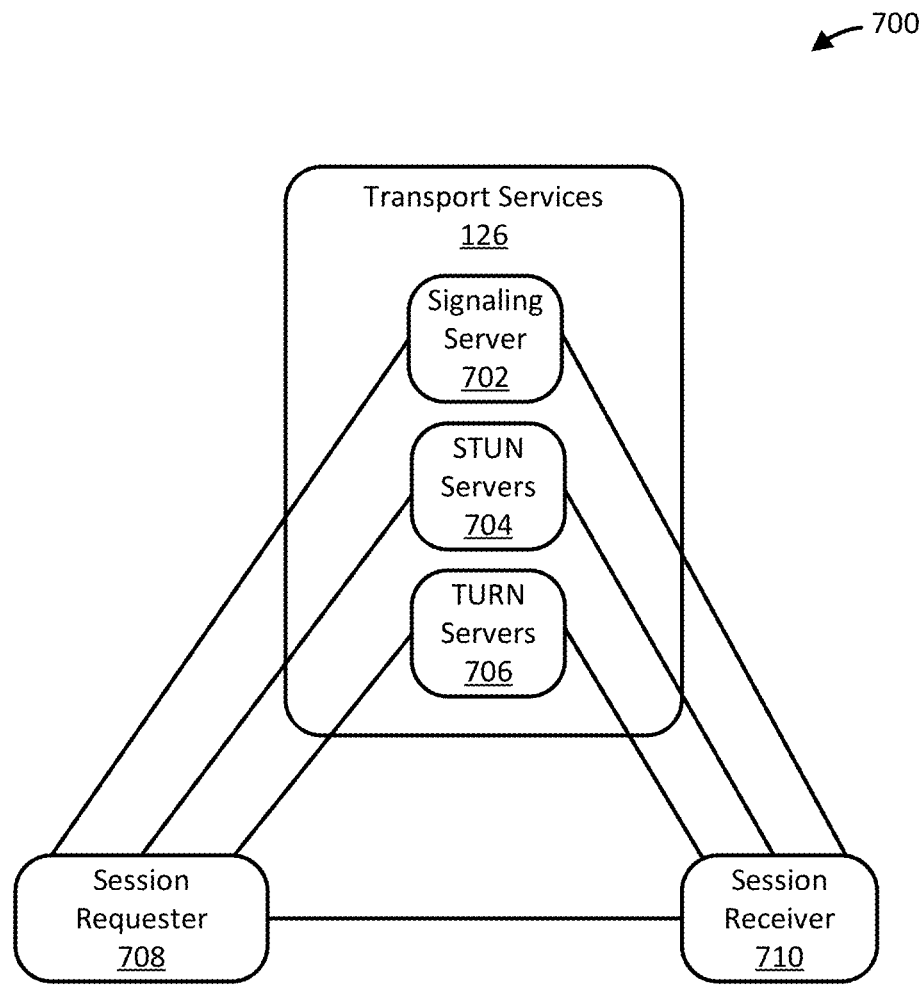
FIG. 7 is a schematic diagram of processes involved in establishing and conducting communication sessions with autonomous security device preparation, according to some examples disclosed herein.

Turning now to FIG. 7, a set of processes 700 involved in establishing and conducting communication sessions (e.g., real time communication sessions) that autonomously prepare security devices for interactive communication sessions are illustrated in a schematic diagram. As shown in FIG. 7, the set of processes 700 includes the transport services 126, which are described above with reference to FIGS. 1, 5, and 6. As is further shown in FIG. 7, the transport service 126 includes a signaling server 702, one or more Session Traversal Utilities for Network Address Translators (STUN) servers 704, and one or more Traversal Using Relays around Network Address Translators (TURN) servers 706. The set of processes 700 further includes a session requester 708 and a session receiver 710. The requester 708 may be one of the monitor interfaces 130 or one of the customer interfaces 132 described above with reference to FIGS. 1, 5, and 6. The receiver 710 may be the surveillance client 136 or a DCS (e.g., the camera agent 138 or another DCS) as described above with reference to FIGS. 1-6.

In some examples, the requester 708 is configured to communicate with the receiver 710 via the signaling server 702 to establish a real time communication session via, for example, web real time communication (WebRTC) framework. However, unlike other processes that establish communication sessions using the WebRTC framework, the requester 708 and the receiver 710 interoperate, via the signaling server 702, to execute code (e.g., preparatory code) on the security device hosting the receiver 710. This preparatory code can control a processor of the security device to take any of a variety of programmatic operations, such as configuring one or more operational parameters of the security device beyond communication session parameters. For instance, in some examples, the requester 708 is configured to communicate, via the signaling server 702, an identifier (e.g., a client identifier) that indicates whether the requester 708 is a monitor interface, a customer interface, or some other type of requester. In these examples, the receiver 710 is configured to receive the client identifier, identify the type of requester indicated by the client identifier, and autonomously configure operational parameters of the host device based on the identified requester type. Examples of operational parameters that can be configured in these examples, include operational parameters that control a user interface of the security device, operational parameters that control recordation of video acquired by the security device (e.g., where the host device is, or includes, a camera), and operational parameters that control remote access to the security device. Examples of processes and operations that the requester 708 and/or the receiver 710 are configured to execute are further described below with reference to FIGS. 8A-12.

Continuing with the example of FIG. 7, the signaling server 702 is configured to act as an intermediary or broker between the requester 708 and the receiver 710 while a communication session is established. As such, in some examples, an address (e.g., an IP address and port) of the signaling server 702 is accessible to both the requester 708 and the receiver 710. For instance, the IP address and port number of the signaling server 702 may be stored as configuration data in memory local to the devices hosting the requester 708 and the receiver 710. In some examples, the receiver 710 is configured to retrieve the address of the signaling server 702 and to register with the signaling server 702 during initialization to notify the signaling server of its availability for real time communication sessions. In these examples, the requester 708 is configured to retrieve the address of the signaling server 702 and to connect with the signaling server 702 to initiate communication with the receiver 710 as part of establishing a communication session with the receiver 710. In this way, the signaling server 702 provides a central point of contact for a host of requesters including the requester 708 and a central point of administration of a host of receivers including the receiver 710. Examples of processes and operations that signaling server 702 is configured to execute are further described below with reference to FIG. 8A.

Continuing with the example of FIG. 7, the STUN servers 704 receive, process, and respond to requests from other devices seeking their own public IP addresses. In some examples, individual requesters 708 and the receiver 710 are configured to interoperate with the STUN servers 704 to determine the public IP address of its host device. The TURN servers 706 receive, process, and forward WebRTC messages from one device to another. In some examples, individual requesters 708 and the receiver 710 are configured to interoperate with the TURN servers 706, if a WebRTC session that utilizes the public IP addresses of the host devices cannot be established (e.g., a network translation device, such as a firewall, is interposed between the host devices). Examples of processes and operations that the STUN servers 704 and/or the TURN servers 706 are configured to execute are further described below with reference to FIG. 8A.

Turning now to FIGS. 8A-8D, a process 800 of establishing and conducting a communication session including remote intervention and autonomous security device preparation is illustrated as a sequence diagram. The process 800 can be executed, in some examples, by a security system (e.g., the security system 100 of FIG. 1). More specifically, in some examples, at least a portion of the process 800 is executed by one or more location-based devices under the control of a session receiver (e.g., the receiver 710 of FIG. 7) implemented by at least one processor. At least a portion of the process 800 is executed by a monitoring center environment (e.g., the monitoring center environment 120 of FIG. 1) or a customer device (e.g., the customer device 122 of FIG. 1) under control of a session requester (the requester 708 of FIG. 7) implemented by at least one processor. At least a portion of the process 800 is executed by a data center environment (e.g., the data center environment 124 of FIG. 1) under control of transport services (e.g., the transport services 126 of FIG. 1) implemented by at least one processor. At least a portion of the process 800 is executed by a base station (e.g., the base station 114 of FIG. 1) under control of a surveillance client (e.g., the surveillance client 136 of FIG. 1). In certain examples, at least a portion of the process 800 is executed by one or more location-based devices under the control of DCS code implemented by one or more processors of the location-based devices.

Figure 8A:
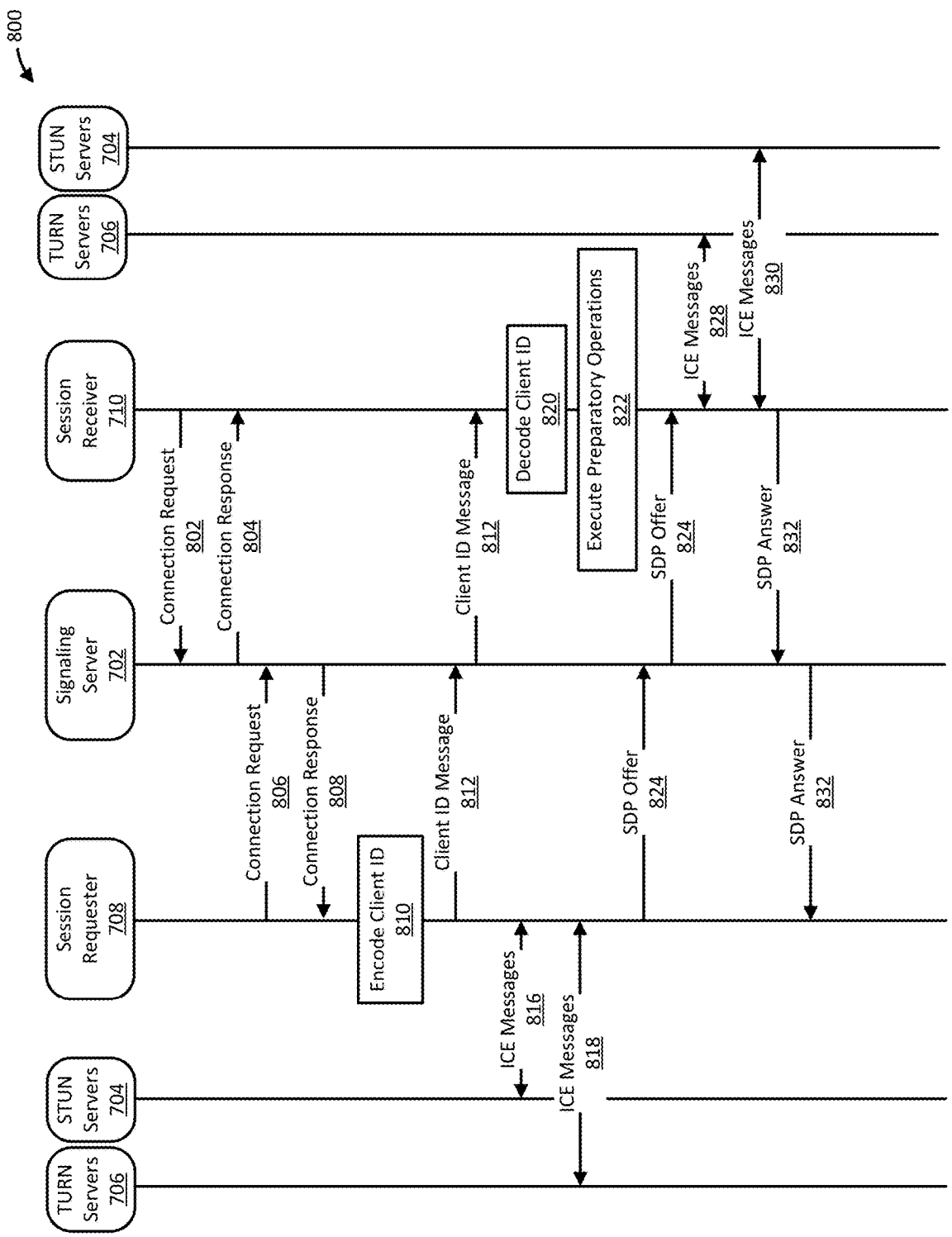
FIGS. 8A-8D are a sequence diagram of a process of establishing and conducting communication sessions that support remote interventions and include autonomous security device preparation, according to some examples disclosed herein.

As shown in FIG. 8A, the process 800 starts with the session receiver communicating a message 802 specifying a connection request to the signaling server. For instance, in some examples, the session receiver transmits a request message to open a TCP socket or a WebSocket to the signaling server as part of an initialization process executed by the device hosting the session receiver.

Continuing with the process 800, the signaling server processes the message 802 and communicates a message 804 specifying a connection response to the session receiver. For instance, in some examples, the signaling server transmits a response message that acknowledges parameters of the connection proposed in the message 802 are acceptable and a connection between the session receiver and the signaling server is established.

Continuing with the process 800, the session requester communicates a message 806 specifying a connection request to the signaling server. For instance, in some examples, the session requester transmits a request message to open a TCP socket or a WebSocket to the signaling server in response to reception of input from a user specifying a request for a communication session (e.g., a real time communication session) with the session receiver. A user may input such a request in response to a notification of a reportable event (e.g., detected motion, etc.) generated by the device hosting the session receiver. In this case, the session requester records an association (e.g., a data structure storing an identifier of the reportable event and an identifier of the connection request) between the reportable event and the connection request. For instance, in some examples, the session requester interoperates (e.g., via one or more API calls) with a surveillance service (e.g., the surveillance service 128 of FIG. 5) to request recordation of the association.

Continuing with the process 800, the signaling server processes the message 806 and communicates a message 808 specifying a connection response to the session requester. For instance, in some examples, the signaling server transmits a response message that acknowledges parameters of the connection proposed in the message 806 are acceptable and a connection between the session requester and the signaling server is established.

Continuing with the process 800, the session requester encodes 810 an identifier (e.g., client identifier) to specify a type of the session requester and communicates a message 812 specifying the encoded client identifier to the signaling server. For instance, in some examples, the session requester encodes the client identifier to specify a current timestamp, a type of the session requester, and an identifier of the device hosting the session receiver and generates the message 812 to incorporate the encoded client identifier. In certain examples, the client identifier is an object with properties configured to store the current timestamp, the session requester type, and the identifier of the device hosting the session receiver. In these examples, the session requester stores data specifying the current timestamp, the session requester type, and the identifier of the device hosting the session receiver in the properties of the client identifier. It should be noted that the client identifier can serve as an indication of a type of user (e.g., monitoring personnel or a customer) originating a request for a communication session. It should also be noted that, in some examples, the client identifier is omitted from the message 812 in favor of another identifier (e.g., an identifier without encoded information) but that still indicates the user's type. Next, the session requester transmits the message 812 to the signaling server.

Continuing with the process 800, the signaling server processes the message 812 and communicates the message 812 to the session receiver. For instance, in some examples, the signaling server parses the message 812, determines that the message 812 is addressed to the session receiver, and forwards the message 812 to the session receiver.

Figure 9:
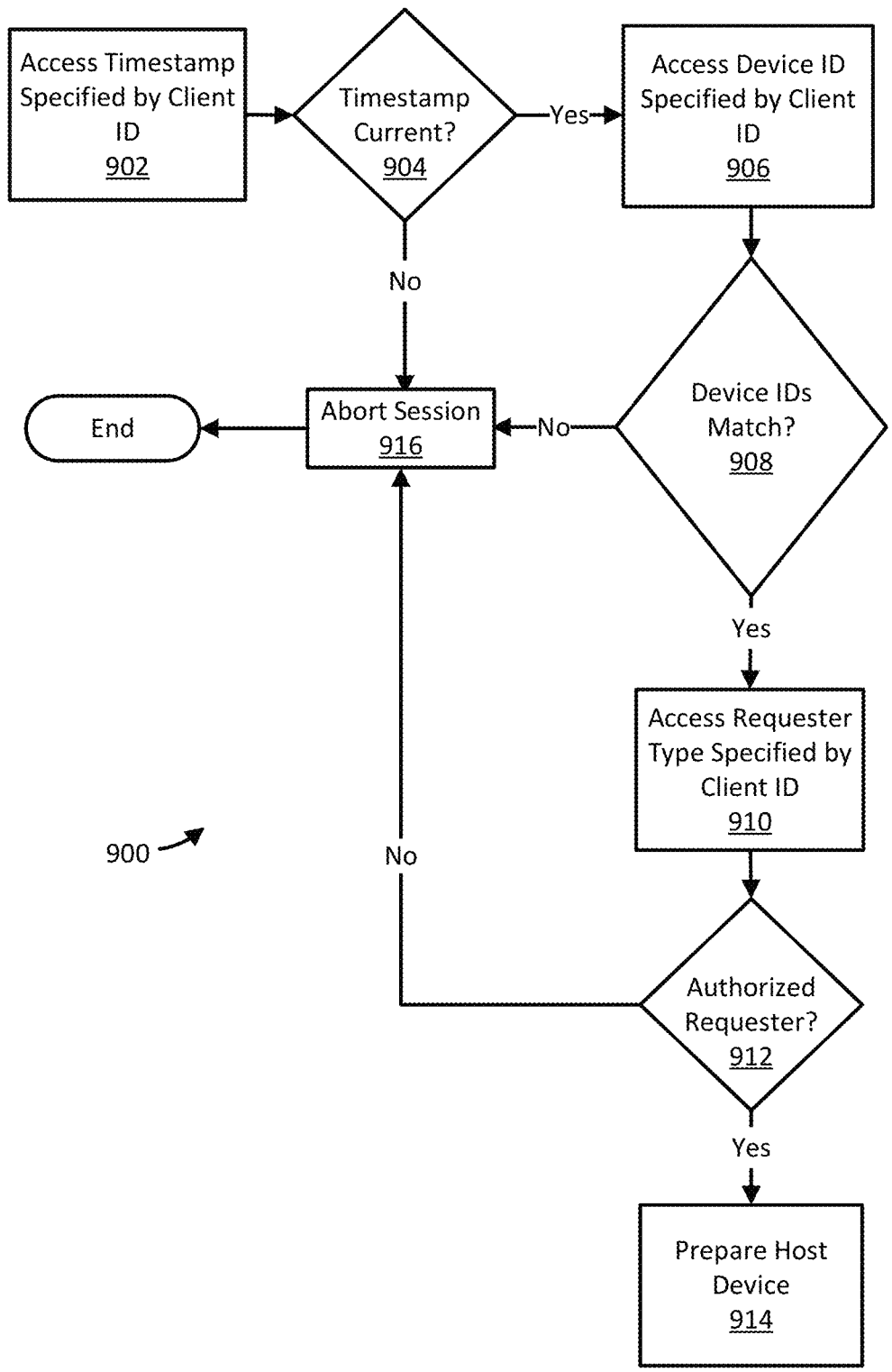
FIG. 9 is a flow diagram of a process of autonomously preparing a security device for a communication session with a requester of a particular type, according to some examples disclosed herein.

Continuing with the process 800, the session receiver processes the message 812. For instance, in some examples, the session receiver receives the message 812 and parses the message 812 to extract the encoded client identifier. Next, the session receiver decodes 820 the encoded client identifier and executes 822 preparatory operations based on the type of session requester indicated by the decoded client identifier. FIG. 9 illustrates, as a flow diagram, one example of a process 900 executed within the operation 822. As shown in FIG. 9, the process 900 starts with the session receiver accessing 902 a timestamp specified by the client identifier. For instance, in some examples, the session receiver accesses a property of the client identifier that holds the timestamp.

Continuing with the process 900, the session receiver determines 904 whether the timestamp specified by the client identifier is current. For instance, in some examples, the session receiver accesses a current timestamp maintained by its host device and compares the current timestamp to the timestamp specified by the client identifier. In these examples, if the two timestamps differ by more than a configurable threshold value, the session receiver determines that the timestamp specified by the client identifier is not current and proceeds to operation 916. In some examples, the value of the configurable threshold is set to match a maximum duration of a communication session (e.g., 5, 10, or 20 minutes, etc.). If the difference between the two time stamps is less than or equal to the configurable threshold value, the session receiver determines that the timestamp specified by the client identifier is current and proceeds to operation 906.

Continuing with the process 900, the session receiver accesses 906 an identifier of the device hosting the session receiver specified by the client identifier. For instance, in some examples, the session receiver accesses a property of the client identifier that holds the identifier of the device hosting the session receiver.

Continuing with the process 900, the session receiver determines 908 whether the identifier of the host device specified by the client identifier matches an identifier of the device actually hosting the session receiver. For instance, in some examples, the session receiver accesses a device ID maintained by its host device and compares the device ID to the identifier of the host device specified by the client identifier. In these examples, if the identifier of the host device specified by the client identifier differs from the device ID maintained by the actual host device, the session receiver determines that a mismatch exists and proceeds to the operation 916. If the identifier of the host device specified by the client identifier does not differ from the device ID maintained by the actual host device, the session receiver determines that a match exists and proceeds to operation 910.

Continuing with the process 900, the session receiver accesses 910 an identifier of the type of the session requester specified by the client identifier. For instance, in some examples, the session receiver accesses a property of the client identifier that holds the identifier of the type of the session requester. Examples of these types can include string values such as "customer" and "monitor" among others.

Continuing with the process 900, the session receiver determines 912 whether the session requester is of a type that is authorized to establish a real time communication session with the session receiver. For instance, in some examples, the session receiver accesses a configurable list of types of session requesters maintained by its host device that enumerates types of session requesters authorized to establish real time communication sessions with the session receiver. In these examples, the session receiver compares the type specified by the client identifier to the list of types. If the type specified by the client identifier is not in the list of types, the session receiver determines that the session requester is not authorized to establish a real time communication session with the session receiver and interoperates with the session requester to abort 916 the real time communication session, thereby ending the process 900 and the process 800 of FIG. 8. The operation 916 may include transmission of one or more error messages from the session receiver to the session requester that indicate a reason for the abortion (e.g., the timestamp is not current per the operation 904, the device ID to the identifier of the host device are mismatched per the operation 908, or the session requester lacks authorization to establish a real time communication session with the session receiver per the operation 912). If the type specified by the client identifier is in the list of types, the session receiver determines the session requester is authorized to establish a real time communication session with the session receiver and proceeds to operation 914.

Continuing with the process 900, the session receiver prepares 914 its host device for a communication session (e.g., a real time communication session) with the session requester. For instance, in some examples of the operation 914, the session receiver executes one or more preparatory programmatic operations. These preparatory programmatic operations can include initiating, on the device hosting the session receiver, execution of processes with flow control that depends on the type of the session requester. In some examples, the processes initiated by the operation 914 with flow control that depends on the type of the session requester include the processes described below with reference to FIGS. 10-12. The preparatory programmatic operations can also include applying settings, specific to the type of the session requester, to one or more operational parameters of the device hosting the session receiver. Applying the settings may include, for instance, storing specific, predefined values or other values at memory locations referenced by the processor of the device hosting the session receiver during subsequent operations. The one or more operational parameters configured by the operation 914 can vary based on the capabilities of the device hosting the session receiver and can include parameters beyond communication session parameters specified in a session description protocol (SDP) offer or answer. SDP offers and answers are messages exchanged between processes to establish a real time communication session using the WebRTC framework, as is described further below with reference to FIG. 8A. In some examples, the operational parameters can include a parameter that specifies a type of the session requester. This parameter may be set to a string value (e.g., "customer" or "monitor") accessed in various operations. Additionally or alternatively, the one or more operational parameters can specify one or more audio cues output in operations 854 and 859 of FIGS. 8B and 8C, as described further below. In some examples, as part of the operation 914, the session receiver stores, in local memory, original settings of the operational parameters prior to applying the new settings. This feature enables the session receiver to easily reverse the new settings via subsequent processing (e.g., operation 868, which is described further below with reference to FIG. 8D). Subsequent to execution of the operation 914, the process 900 ends.

It should be noted that the determinations 904, 908, and 912 are illustrated by way of example only. In some examples, the determinations are executed in an order different from the order illustrated in FIG. 9. Further, in some examples, one or more of the determinations 904, 908, and 912 is omitted. Thus, the examples disclosed herein are not limited to the particular order of operations nor the particular determinations illustrated in FIG. 9.

It should be further noted that the process 900 prepares or configures features of the session receiver for a particular type of communication session based on the type of session requester. In at least some examples, the actions taken by the session receiver are not specified within the webRTC framework, but reside outside of the actions the webRTC framework natively supports.

Returning to the process 800 with reference to FIG. 8A, the session requester exchanges interactive connectivity establishment (ICE) messages 816 and/or 818 with the STUN servers and/or the TURN servers, respectively. Via this exchange of the messages 816 and/or 818, the session requester generates one or more ICE candidates and includes the one or more ICE candidates within a message 824 specifying an SDP offer. Next, the session requester transmits the message 824 to the signaling server, and the signaling server transmits the message 824 to the session receiver. The session receiver exchanges ICE messages 828 and/or 830 with the TURN servers and/or the STUN servers, generates one or more ICE candidates and includes the one or more ICE candidates within a message 832 specifying an SDP answer. Next, the session receiver transmits the message 832 to the signaling server, and the signaling server transmits the message 832 to the session requester. Via the messages 824 and 832, the session requester and the session receiver negotiate communication parameters for the real time communication session and, with continued reference to FIG. 8B, open 834 the real time communication session.

Figure 8B:
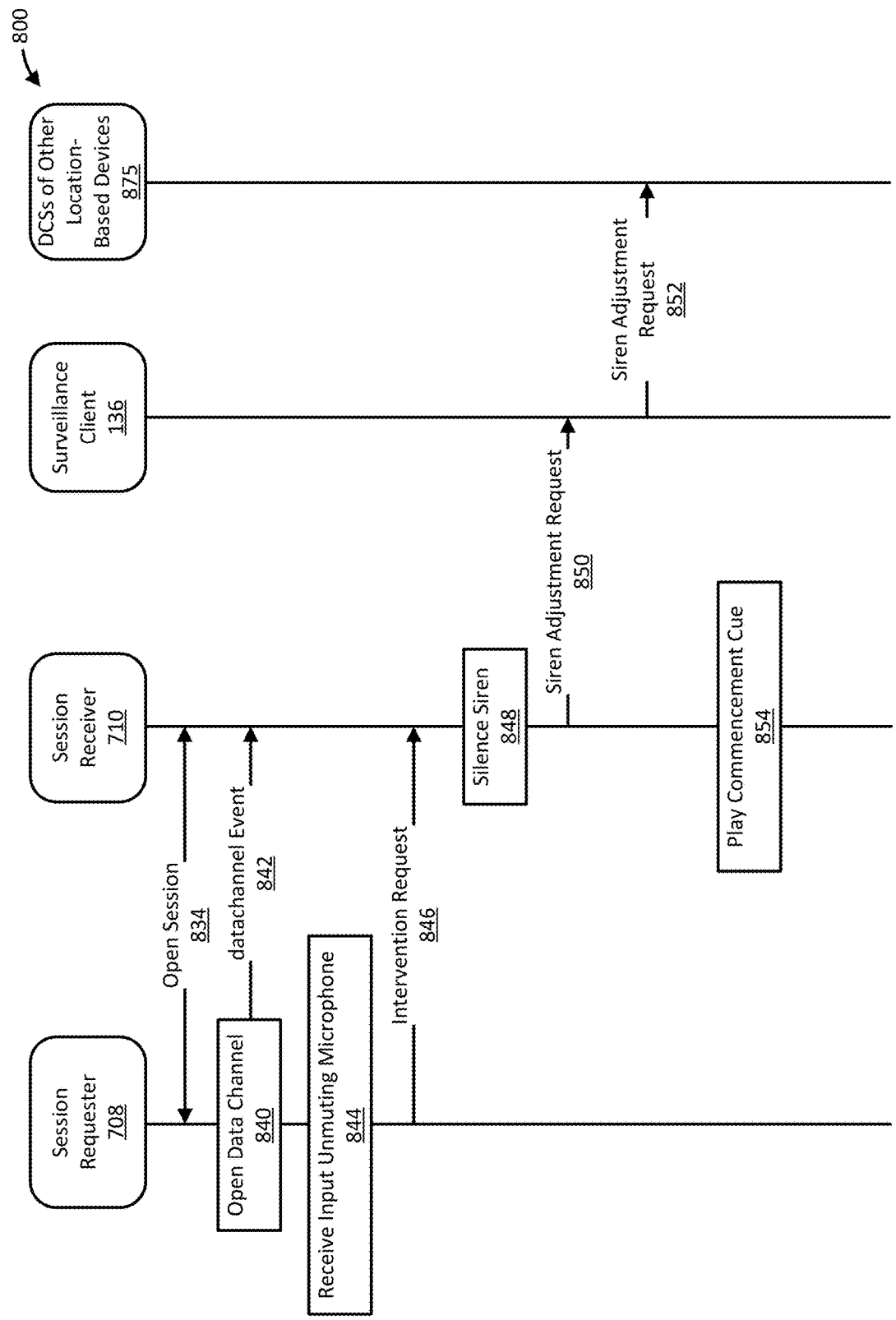

Continuing with the process 800 with reference to FIG. 8B, the session requester opens 840 a data channel with the session receiver. For instance, in some examples, the session requester calls the createDataChannel( ) WebRTC API call to open the data channel with the session receiver. In these examples, the createDataChannel( ) call transmits a message 842 specifying a data channel to the session receiver. The session receiver, in turn, processes the message 842 and opens the requested data channel.

Continuing with the process 800, the session requester receives 844 input from a user specifying a request to unmute a microphone of the device hosting the session requester (e.g., one of the computing device 518 of FIG. 5 or the customer device 122 of FIGS. 1 and 5). For instance, in some examples, the user (e.g., a monitoring agent or a customer) requests a real time communication session via the host device of the session receiver (e.g., a location-based device with a speaker and a microphone) in response to receiving an alert at a monitored location (e.g., the location 102A of FIG. 1).

Continuing with the process 800, the session requester processes the input by generating and transmitting a message 846 to the session receiver via the data channel. For instance, in some examples, the message 846 specifies a request to intervene in a reportable event occurring at the monitored location via the host device of the session receiver. This intervention may include, for example, monitoring personnel and/or a customer interacting with a person at the monitored location via the host device of the session receiver.

Continuing with the process 800, the session receiver processes the message 846. For instance, in some examples, if a siren of the host device of the session receiver is active, the session receiver silences 848 the siren. For instance, in some examples, the session receiver configures an operational parameter of the host device that controls siren volume to a mute setting. Further, in some examples, the session receiver generates and transmits a message 850 to a surveillance client hosted by a base station within the monitored location. The message 850 specifies a request to adjust volumes of sirens at the monitored location. For instance, in some examples, the message 850 specifies, via a siren setting, that all sirens at the monitored location, except sirens silenced in the operation 848, should be adjusted to a low setting.

Continuing with the process 800, the surveillance client receives and processes the message 850. For instance, in some examples, the surveillance client parses the message 850 to extract the siren setting and, if the surveillance client is not hosted by the host device of the session receiver, adjusts the volume of a siren to match the siren setting. In these examples, the surveillance client can store the previous siren setting in local memory for potential subsequent reinstatement. Additionally or alternatively, in some examples, the surveillance client generates and transmits one or more messages 852 to one or more DCSs of one or more other location-based devices 875 that incorporate or control sirens. The messages 852 specify requests to adjust volumes of sirens at the monitored location. For instance, in some examples, the messages 852 specify, via siren settings, that sirens incorporated in or controlled by the one or more other location-based devices 875 should be adjusted to a low setting.

Continuing with the process 800, the one or more DCSs of the one or more other location-based devices 875 receive and process the one or more messages 852. For instance, in some examples the one or more DCSs parse the messages 852 to extract the siren settings and adjust the volume of sirens incorporated or controlled by the one or more other location-based devices 875 to match the siren settings. In these examples, the one or more DCSs can store the previous siren settings in local memory for potential subsequent reinstatement.

Continuing with the process 800, the session receiver outputs 854, via a speaker of the host device, an audio cue that indicates a real time communication session is about to begin. In these examples, the audio cue output may be specified by a configurable operational parameter that is set, for example, based on the type of the session requester in the operation 914 of FIG. 9, as described above.

Figure 8C:
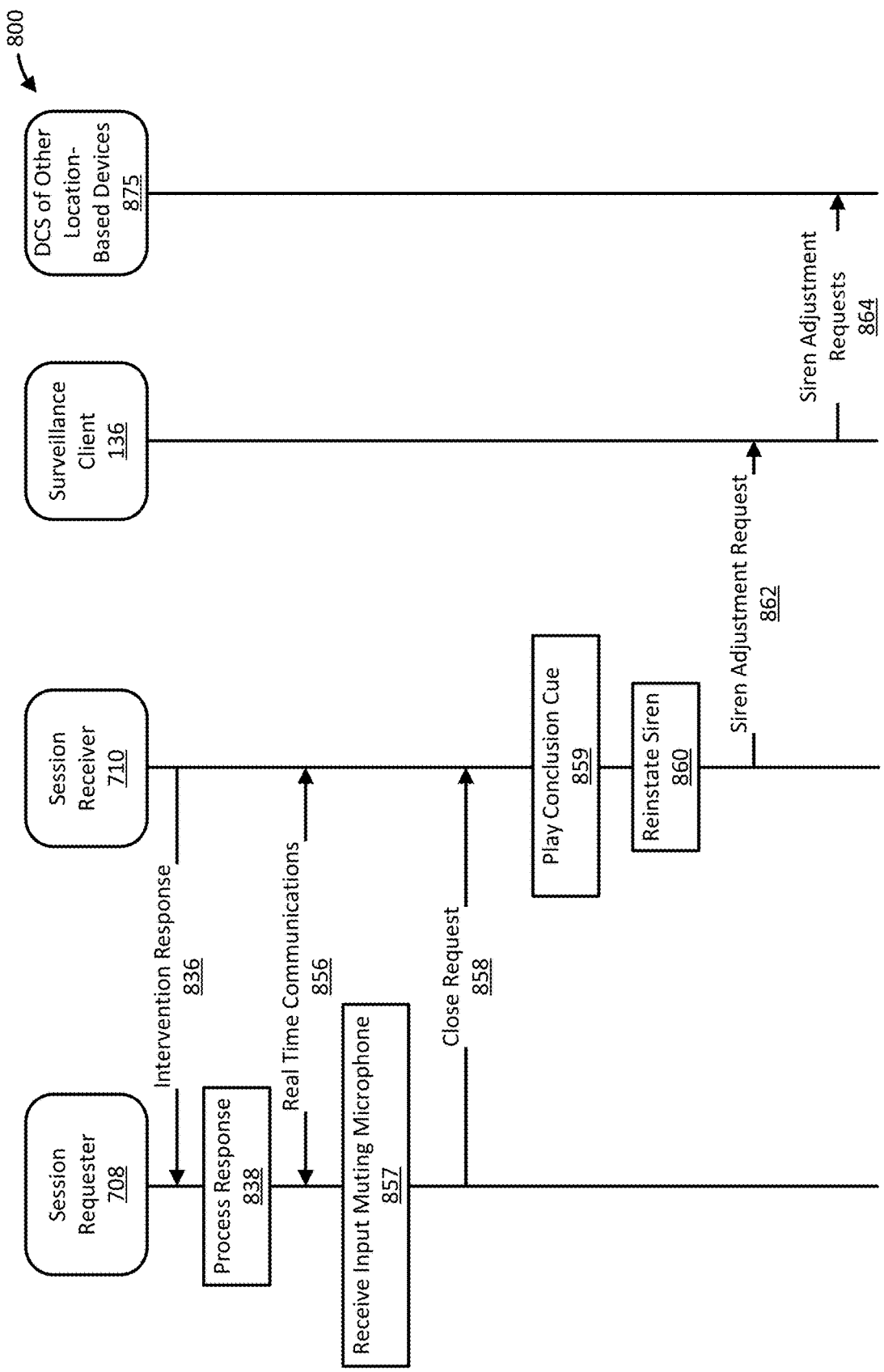

Continuing with the process 800 with reference to FIG. 8C, the session receiver transmits, via the data channel, a message 836 specifying a response to the message 846 to the session requester. In some examples, the response indicates results of the operations initiated by the message 846 (e.g., success or failure codes, etc.).

Continuing with the process 800, the session requester receives and processes 838 the message 836. For instance, in some examples, the session requester parses the message 836 to extract the results indicated therein and renders a human readable representation of the results via a user interface of the device hosting the session requester. In this way, the session requester informs its user as to whether the monitored location is ready to support interactions between the user and individuals at the monitored location via the real time communication session.

Continuing with the process 800, the session requester and the session receiver exchange real time communications 856 via the real time communication session. These real time communications 856 may include audio and/or video content of interactions between monitoring personnel and/or a customer and a person at the monitored location. During these real time communications 856, the session requester can receive input specifying further adjustments to siren volume and can interoperate with the session receiver to carry out those adjustments. The further adjustments of siren volume can include, for example, reinstatement of the original siren volume or other adjustments.

Continuing with the process 800, at a subsequent point, the session receiver and/or the session requester notifies its counterpart that the communication session is to be closed. For instance, in some examples, a timer implemented by the session receiver may expire. Alternatively or additionally, a user interacting with either the session requester or the session receiver may input a request to terminate the communication session. For instance, in some examples, the session requester receives 857 input from its user specifying a request to mute a microphone of the device hosting the session requester. In these examples, the session requester processes the input by generating and transmitting a message 858 to the session receiver via the data channel. In some examples, the message 858 specifies a request to close the communication session. Regardless of the initiator, in some examples, the session receiver outputs 859, via a speaker of the host device, an audio cue that indicates a communication session has concluded. In some examples, the audio cue output may be specified by a configurable operational parameter that is set, for example, based on the type of the session requester in the operation 914 of FIG. 9, as described above.

Continuing with the process 800, the session receiver reinstates 860 the siren. For instance, in some examples, the session receiver configures an operational parameter of the host device of the session receiver that controls siren volume to a unmute setting. Further, in some examples, the session receiver generates and transmits a message 862 to the surveillance client hosted by the base station within the monitored location. The message 862 specifies a request to adjust volumes of sirens at the monitored location. For instance, in some examples, the message 862 specifies, via a siren setting, that all sirens at the monitored location, except for the siren reinstated by the operation 860, should be adjusted to a previous setting stored in local memory.

Continuing with the process 800, the surveillance client receives and processes the message 862. For instance, in some examples, the surveillance client parses the message 862 to extract the siren setting and, if the surveillance client is not hosted by the host device of the session receiver, adjusts the volume of a siren to match the siren setting. Additionally or alternatively, in some examples, the surveillance client generates and transmits one or more messages 864 to one or more DCSs of one or more other location-based devices 875 that incorporate or control sirens. The messages 864 specify requests to adjust volumes of sirens at the monitored location. For instance, in some examples, the messages 862 specify, via siren settings, that the sirens incorporated in or controlled by the one or more other location-based devices 875 should be adjusted to a previous setting stored in local memory.

Continuing with the process 800, the one or more DCSs of the one or more other location-based devices 875 receive and process the one or more messages 864. For instance, in some examples the one or more DCSs parse the messages 864 to extract the siren settings and adjust the volume of sirens incorporated or controlled by the one or more other location-based devices 875 to match the siren settings.

It should be noted that, in some examples, the operation 860 is omitted or does not fully reinstate the siren(s). In these examples, the siren adjustment requests 862 and 864 are not sent or specify a volume level different from (e.g., lower) than the previous siren settings stored in local memory. In still other examples, the operation 860 is executed if the communication session closes abnormally (e.g., without successfully completing operation 866 as described below).

Figure 8D:
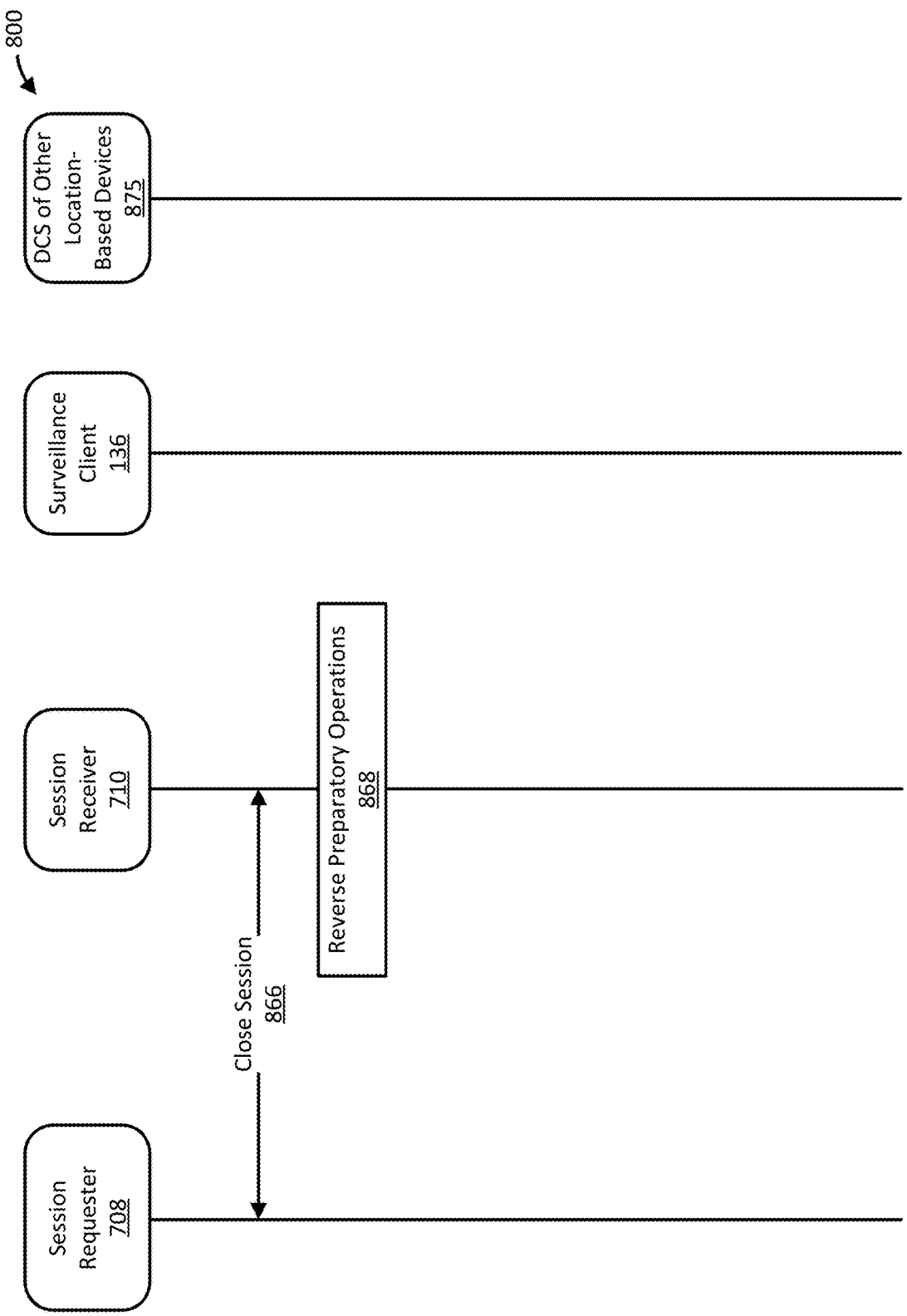

Continuing with the process 800 with reference to FIG. 8D, the session requester and the session receiver interoperate to close 866 the communication session. After the communication session is closed, the session receiver reverses 868 one or more the preparatory operations executed in the operation 914 of FIG. 9. For instance, in some examples, the session receiver terminates processes initiated to prepare the device hosting the session receiver for the communication session and reconfigures one or more operational parameters of the device hosting the session receiver to one or more default settings or one or more original settings (e.g., one or more values in place prior to the operation 914 of FIG. 9). Next, the session receiver executes any additional programmatic operations required to make the one or more reconfigured operational parameters take effect. Subsequent to execution of the operation 868, the process 800 ends.

It should be noted that, in some examples, each of the processes described herein can respond to a message received from another process by generating and transmitting an acknowledgment of the receipt of the message to the other process. Such an acknowledgment message can indicate that the message was received. Additionally or alternatively the acknowledgment can specify a result of processing the message (e.g., success, failure, error code, or the like).

Figure 10:
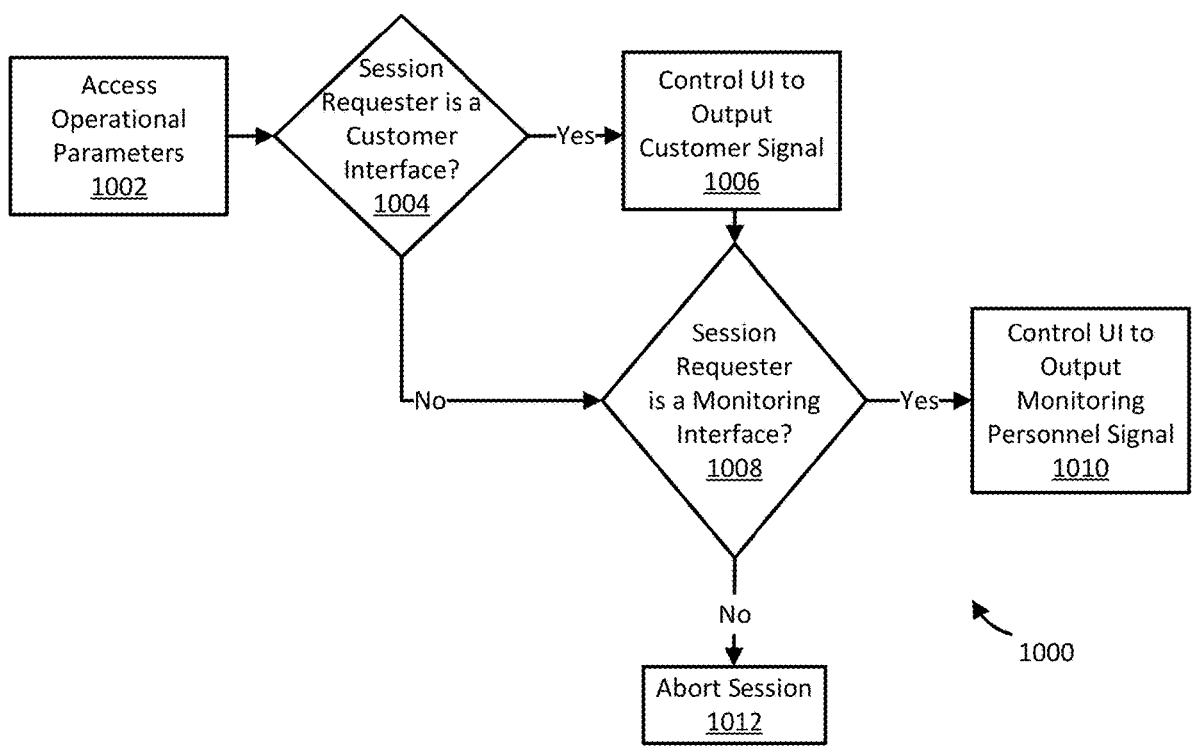
FIG. 10 is a flow diagram of a session requester indication process that can be executed during autonomous preparation of a security device for a communication session with a requester of a particular type, according to some examples disclosed herein.

Turning now to FIG. 10, a process 1000 of indicating a type of a session requester that can be initiated during autonomous preparation of a security device for a communication session (e.g., a real time communication session) is illustrated as a flow diagram. The process 1000 can be executed, in some examples, by a security system (e.g., the security system 100 of FIG. 1). More specifically, in some examples, at least a portion of the process 1000 is executed by one or more location-based devices under the control of a session receiver (e.g., the receiver 710 of FIG. 7) implemented by at least one processor. As shown in FIG. 10, the process 1000 starts with the session receiver accessing 1002 operational parameters stored on a device hosting the session receiver. For instance, in some examples, the session receiver reads a value of an operational parameter that specifies the type of the session requester.

Continuing with the process 1000, the session receiver determines 1004 whether the type of the session requester is a customer interface (e.g., one of the customer interfaces 132 of FIG. 1). For instance, in some examples, the session receiver compares the value of the operational parameter accessed in the operation 1002 to a string (e.g., "customer"). In these examples, if the value of the operational parameter matches the string, the session receiver determines that the type of the session requester is a customer interface and proceeds to operation 1006. Further, in these examples, If the value of the operational parameter does not match the string, the session receiver determines that the type of the session requester is not a customer interface and proceeds to operation 1008.

Continuing with the process 1000, the session receiver controls 1006 a user interface to indicate that the session requester is a customer interface (e.g., that a customer is interacting with the host device of the session receiver via a real time communication session). For instance, in some examples, the session receiver controls an LED of the user interface to illuminate in a color or pattern associated with and indicative of customer access.

Continuing with the process 1000, the session receiver determines 1008 whether the type of the session requester is a monitor interface (e.g., one of the monitor interfaces 130 of FIG. 1). For instance, in some examples, the session receiver compares the value of the operational parameter accessed in the operation 1002 to a string (e.g., "monitor"). In these examples, if the value of the operational parameter matches the string, the session receiver determines that the type of the session requester is a monitor interface and proceeds to operation 1010. Further, in these examples, if the value of the operational parameter does not match the string, the session receiver determines that the type of the session requester is not a monitor interface and proceeds to operation 1012.

Continuing with the process 1000, the session receiver controls 1010 a user interface to indicate that the session requester is a monitor interface (e.g., that monitoring personnel are interacting with the host device of the session receiver via a real time communication session). For instance, in some examples, the session receiver controls an LED of the user interface to illuminate in a color or pattern associated with and indicative of monitoring personnel access.

Continuing with the process 1000, the session receiver aborts 1012 the communication session because the session requester is unknown. For instance, in some examples, the session receiver interoperates with the session requester to terminate the communication session, thereby ending the process 1000 and the process 800 of FIG. 8. This interoperation may include transmission of one or more error messages from the session receiver to the session requester that indicate the type of the session requester is unidentified. Subsequent to execution of the operation 1010 or the operation 1012, the process 1000 ends.

Figure 11:
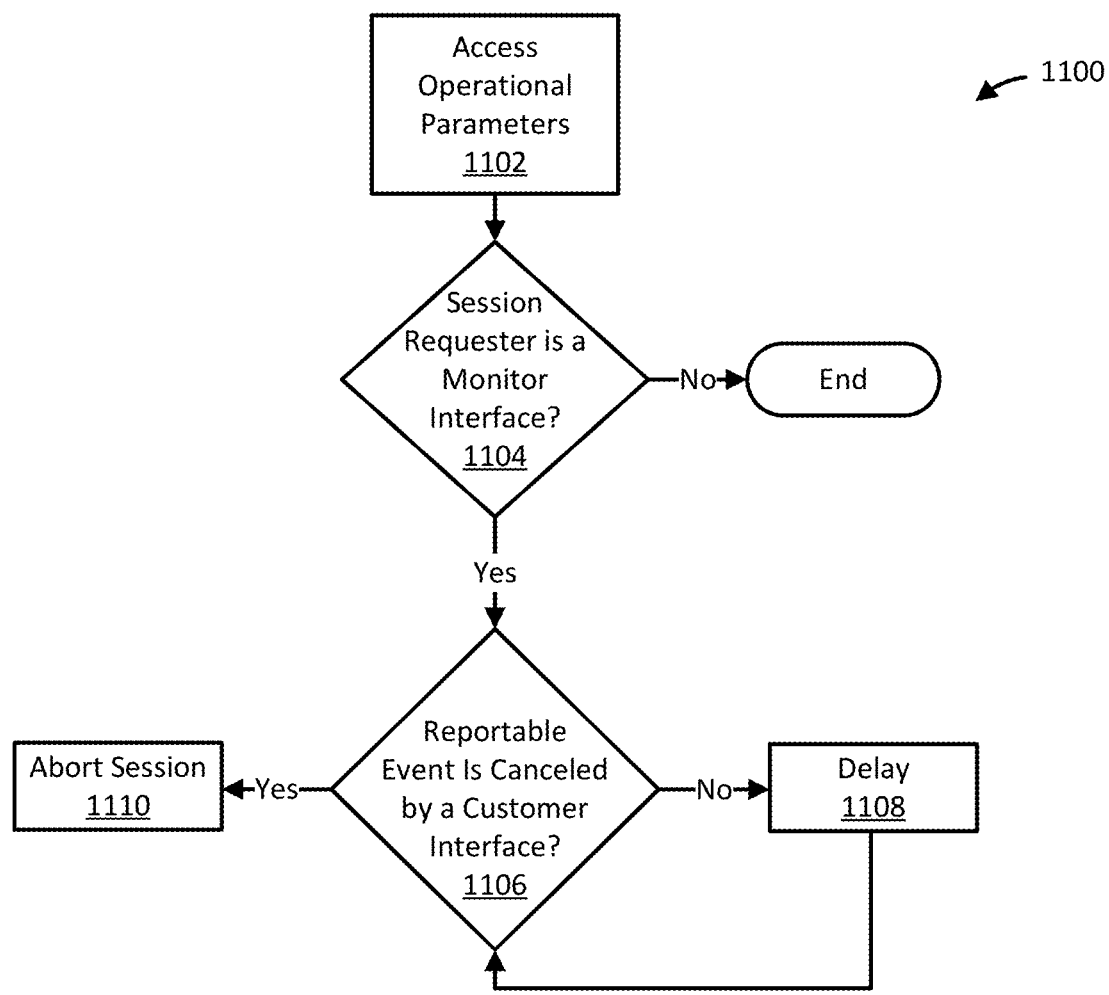
FIG. 11 is a flow diagram a session monitoring process that can be executed during autonomous preparation of a security device for a communication session with a requester of a particular type, according to some examples disclosed herein.

Turning now to FIG. 11, a monitoring process 1100 that can be initiated during autonomous preparation of a security device for a communication session (e.g., a real time communication session) with a requester of a particular type is illustrated as a flow diagram. The process 1100 can be executed, in some examples, by a security system (e.g., the security system 100 of FIG. 1). More specifically, in some examples, at least a portion of the process 1100 is executed by one or more location-based devices under the control of a session receiver (e.g., the receiver 710 of FIG. 7) implemented by at least one processor. As shown in FIG. 11, the process 1100 starts with the session receiver accessing 1102 operational parameters stored on a device hosting the session receiver. For instance, in some examples, the session receiver reads a value of an operational parameter that specifies a type of the session requester.

Continuing with the process 1100, the session receiver determines 1104 whether the type of the session requester is a monitor interface (e.g., one of the monitor interfaces 130 of FIG. 1). For instance, in some examples, the session receiver compares the value of the operational parameter accessed in the operation 1102 to a string (e.g., "monitor"). In these examples, if the value of the operational parameter matches the string, the session receiver determines that the type of the session requester is a monitor interface and proceeds to operation 1106. Further, in these examples, if the value of the operational parameter does not match the string, the session receiver determines that the type of the session requester is not a monitor interface and the process 1100 ends.

Continuing with the process 1100, the session receiver determines 1106 whether a reportable event associated with the communication session has been canceled by a customer interface. For instance, in some examples, the session receiver interoperates (e.g., via one or more API calls) with the surveillance service to determine a status of the reportable event associated with the communication session. If the status of the reportable event is not canceled, the session receiver introduces a delay 1108 prior to re-determining 1106 the status of the reportable event. For instance, in some examples, the session receiver initiates a short duration (>1 sec., >2 sec., >3 sec., etc.) timer and re-determines 1106 the status of the reportable event after expiration of the timer. If the status of the reportable event is canceled, the session receiver proceeds to operation 1110.

Continuing with the process 1100, the session receiver aborts 1110 the communication session because the customer interface canceled the associated reportable event. For instance, in some examples, the session receiver interoperates with the session requester to terminate the communication session, thereby ending the process 1100 and the process 800 of FIG. 8. This interoperation may include transmission of one or more error messages from the session receiver to the session requester that specify the communication session was aborted due to cancelation of the associated reportable event. Subsequent to execution of the operation 1110, the process 1100 ends.

Figure 12:
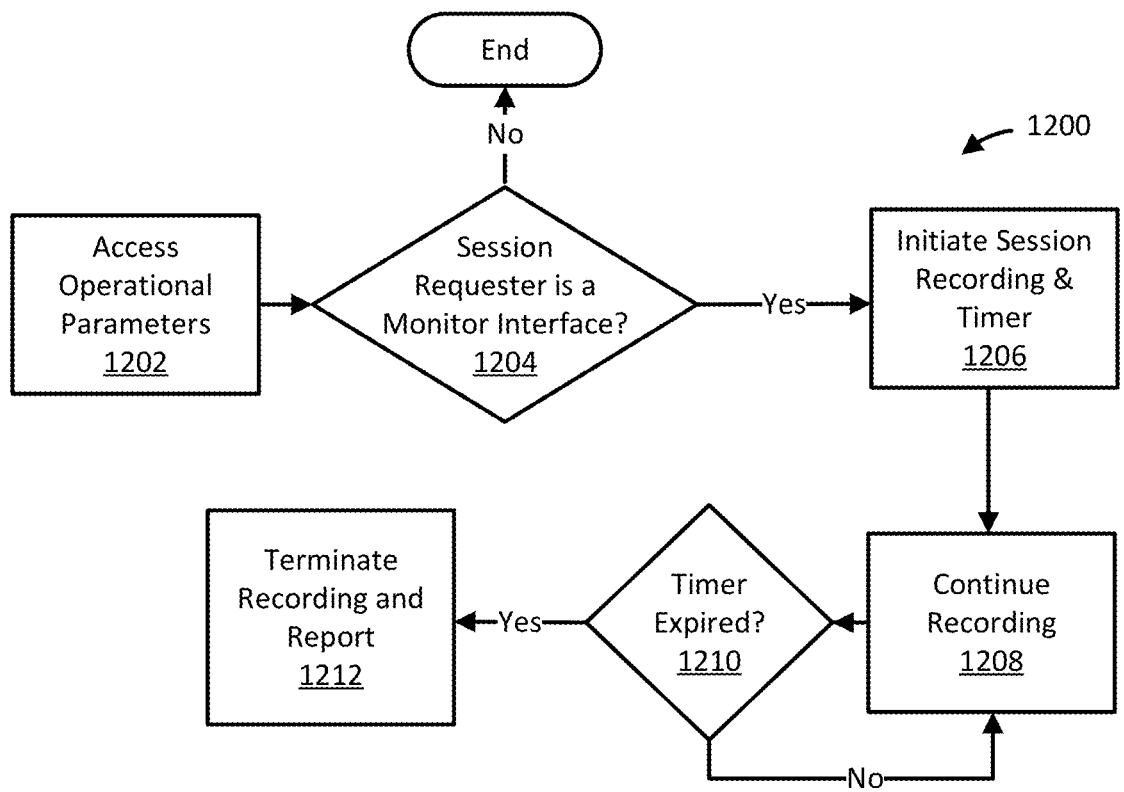
FIG. 12 is a flow diagram a session recordation process that can be executed during autonomous preparation of a security device for a communication session with a requester of a particular type, according to some examples disclosed herein.

Turning now to FIG. 12, a session recordation process 1200 that can be initiated during autonomous preparation of a security device for a communication session (e.g., a real time communication session) with a requester of a particular type is illustrated as a flow diagram. The process 1200 can be executed, in some examples, by a security system (e.g., the security system 100 of FIG. 1). More specifically, in some examples, at least a portion of the process 1200 is executed by one or more location-based devices under the control of a session receiver (e.g., the receiver 710 of FIG. 7) implemented by at least one processor. As shown in FIG. 12, the process 1200 starts with the session receiver accessing 1202 operational parameters stored on a device hosting the session receiver. For instance, in some examples, the session receiver reads a value of an operational parameter that specifies a type of the session requester.

Continuing with the process 1200, the session receiver determines 1204 whether the type of the session requester is a monitor interface (e.g., one of the monitor interfaces 130 of FIG. 1). For instance, in some examples, the session receiver compares the value of the operational parameter accessed in the operation 1202 to a string (e.g., "monitor"). In these examples, if the value of the operational parameter matches the string, the session receiver determines that the type of the session requester is a monitor interface and proceeds to operation 1206. Further, in these examples, if the value of the operational parameter does not match the string, the session receiver determines that the type of the session requester is not a monitor interface and the process 1200 ends.

Continuing with the process 1200, the session receiver initiates a session recording and a timer 1206 to record the communication session while limiting the amount of time and recording storage consumed thereby. For instance, in some examples, the timer is set to expire in a configurable, predetermined amount of time and the session recording is streamed to the surveillance service for storage (e.g., in the sensor data store 504 of FIG. 5) so long as the timer has not expired. Examples of the configurable, predetermined amount of time can include 2 minutes, 5 minutes, 10 minutes, 20 minutes, 30 minutes, or longer.

Continuing with the process 1200, the session receiver continues 1208 the session recording and determines 1210 whether the timer initiated in the operation 1206 has expired. If the timer has not expired, the session receiver continues 1208 the session recording. If the timer has expired, the session receiver proceeds to operation 1212.

Continuing with the process 1200, the session receiver terminates the session recording and reports 1212 the session recording to a customer interface (e.g., one of the customer interfaces 132 of FIG. 1). For instance, in some examples, the session receiver interoperates (e.g., via one or more API calls) with the surveillance service to terminate the session recording and request that the session recording be reported to the customer interface. In certain examples, the surveillance service is configured to report session recordings within a customer timeline that is rendered by the customer interface.

Figure 13:
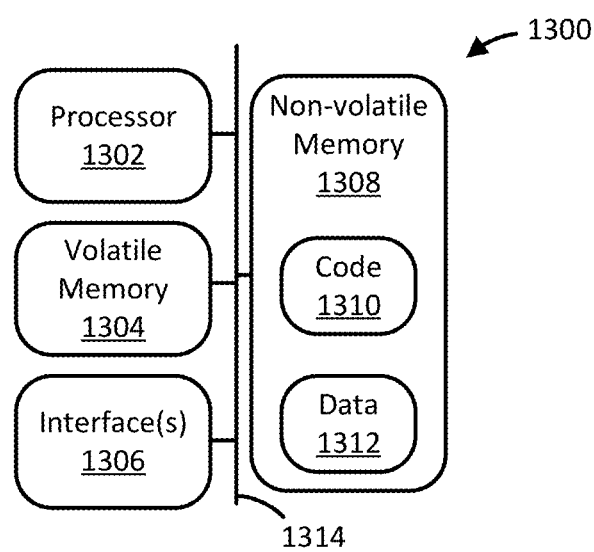
FIG. 13 is a schematic diagram of a computing device, according to some examples described herein.

Turning now to FIG. 13, a computing device 1300 is illustrated schematically. As shown in FIG. 13, the computing device includes at least one processor 1302, volatile memory 1304, one or more interfaces 1306, non-volatile memory 1308, and an interconnection mechanism 1314. The non-volatile memory 1308 includes code 1310 and at least one data store 1312.

In some examples, the non-volatile (non-transitory) memory 1308 includes one or more read-only memory (ROM) chips; one or more hard disk drives or other magnetic or optical storage media; one or more solid state drives (SSDs), such as a flash drive or other solid-state storage media; and/or one or more hybrid magnetic and SSDs. In certain examples, the code 1310 stored in the non-volatile memory can include an operating system and one or more applications or programs that are configured to execute under the operating system. Alternatively or additionally, the code 1310 can include specialized firmware and embedded software that is executable without dependence upon a commercially available operating system. Regardless, execution of the code 1310 can result in manipulated data that may be stored in the data store 1312 as one or more data structures. The data structures may have fields that are associated through colocation in the data structure. Such associations may likewise be achieved by allocating storage for the fields in locations within memory that convey an association between the fields. However, other mechanisms may be used to establish associations between information in fields of a data structure, including through the use of pointers, tags, or other mechanisms.

Continuing the example of FIG. 13, the processor 1302 can be one or more programmable processors to execute one or more executable instructions, such as a computer program specified by the code 1310, to control the operations of the computing device 1300. As used herein, the term "processor" describes circuitry that executes a function, an operation, or a sequence of operations. The function, operation, or sequence of operations can be hard coded into the circuitry or soft coded by way of instructions held in a memory device (e.g., the volatile memory 1304) and executed by the circuitry. In some examples, the processor 1302 is a digital processor, but the processor 1302 can be analog, digital, or mixed. As such, the processor 1302 can execute the function, operation, or sequence of operations using digital values and/or using analog signals. In some examples, the processor 1302 can be embodied in one or more application specific integrated circuits (ASICs), microprocessors, digital signal processors (DSPs), graphics processing units (GPUs), neural processing units (NPUs), microcontrollers, field programmable gate arrays (FPGAs), programmable logic arrays (PLAs), or multicore processors. Examples of the processor 1302 that are multicore can provide functionality for parallel, simultaneous execution of instructions or for parallel, simultaneous execution of one instruction on more than one piece of data.

Continuing with the example of FIG. 13, prior to execution of the code 1310 the processor 1302 can copy the code 1310 from the non-volatile memory 1308 to the volatile memory 1304. In some examples, the volatile memory 1304 includes one or more static or dynamic random access memory (RAM) chips and/or cache memory (e.g. memory disposed on a silicon die of the processor 1302). Volatile memory 1304 can offer a faster response time than a main memory, such as the non-volatile memory 1308.

Through execution of the code 1310, the processor 1302 can control operation of the interfaces 1306. The interfaces 1306 can include network interfaces. These network interfaces can include one or more physical interfaces (e.g., a radio, an ethernet port, a USB port, etc.) and a software stack including drivers and/or other code 1310 that is configured to communicate with the one or more physical interfaces to support one or more LAN, PAN, and/or WAN standard communication protocols. The communication protocols can include, for example, TCP and UDP among others. As such, the network interfaces enable the computing device 1300 to access and communicate with other computing devices via a computer network.

The interfaces 1306 can include user interfaces. For instance, in some examples, the user interfaces include user input and/or output devices (e.g., a keyboard, a mouse, a touchscreen, a display, a speaker, a camera, an accelerometer, a biometric scanner, an environmental sensor, etc.) and a software stack including drivers and/or other code 1310 that is configured to communicate with the user input and/or output devices. As such, the user interfaces enable the computing device 1300 to interact with users to receive input and/or render output. This rendered output can include, for instance, one or more GUIs including one or more controls configured to display output and/or receive input. The input can specify values to be stored in the data store 1312. The output can indicate values stored in the data store 1312.

Continuing with the example of FIG. 13, the various features of the computing device 1300 described above can communicate with one another via the interconnection mechanism 1314. In some examples, the interconnection mechanism 1314 includes a communications bus.

Various inventive concepts may be embodied as one or more methods, of which examples have been provided. The acts performed as part of a method may be ordered in any suitable way. Accordingly, examples may be constructed in which acts are performed in an order different than illustrated, which may include performing some acts simultaneously, even though shown as sequential acts in illustrative examples.

Use of ordinal terms such as "first," "second," "third," etc., in the claims to modify a claim element does not by itself connote any priority, precedence, or order of one claim element over another or the temporal order in which acts of a method are performed. Such terms are used merely as labels to distinguish one claim element having a certain name from another element having a same name (but for use of the ordinal term).

Examples of the methods and systems discussed herein are not limited in application to the details of construction and the arrangement of components set forth in the following description or illustrated in the accompanying drawings. The methods and systems are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular can also embrace examples including a plurality, and any references in plural to any example, component, element or act herein can also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" can be construed as inclusive so that any terms described using "or" can indicate any of a single, more than one, and all of the described terms. In addition, in the event of inconsistent usages of terms between this document and documents incorporated herein by reference, the term usage in the incorporated references is supplementary to that of this document; for irreconcilable inconsistencies, the term usage in this document controls.

Having described several examples in detail, various modifications and improvements will readily occur to those skilled in the art. Such modifications and improvements are intended to be within the scope of this disclosure. Accordingly, the foregoing description is by way of example only, and is not intended as limiting.

The invention claimed is:

1. A method comprising:
receiving, by a camera, a request from a session requester to participate in a session, the request including an identifier that encodes a type of the session requester;
making a determination, by the camera, that the type of the session requester encoded in the identifier is authorized to establish the session with the camera;
selecting, by the camera, based on the type of the session requester one or more actions to configure the camera for the session;
initiating, by the camera, the one or more actions; and
establishing, by the camera and in compliance with a Web Real Time Communication (WebRTC) framework, the session with the session requester after initiation of the one or more actions by the camera.

2. The method of claim 1, wherein initiating the one or more actions comprises initiating a process hosted by the camera that controls a user interface of the camera to output an indication of the type of the session requester, or initiating a process hosted by the camera that records the session.

3. The method of claim 1, wherein:
initiating the one or more actions comprises initiating a process hosted by the camera that controls a user interface of the camera; and
initiating the process hosted by the camera that controls the user interface comprises initiating a process that controls a light emitting diode to illuminate in a color or a pattern associated with the type of the session requester.

4. The method of claim 1, wherein:
initiating the one or more actions comprises initiating a process hosted by the camera that records the session; and
initiating the process hosted by the camera that records the session comprises determining that the type of the session requester is a monitor interface.

5. The method of claim 1, further comprising:
determining that the type of the session requester is a monitor interface;
determining that an event associated with the session is canceled; and
aborting the session with the session requester.

6. The method of claim 1, wherein receiving, by the camera, the request including the identifier that encodes the type of the session requester comprises receiving, by a location-based device, an identifier of either a customer interface or a monitor interface.

7. The method of claim 6, wherein the identifier of either the customer interface or the monitor interface specifies a timestamp and an identifier of the camera.

8. The method of claim 7, further comprising:
determining an actual identifier of the camera; and
comparing the identifier of the camera to the actual identifier of the camera as part of a process to validate the identifier that encodes the type of the session requester.

9. The method of claim 7, further comprising:
encoding, by the session requester, the identifier that specifies the timestamp and the identifier of the camera.

10. A camera comprising:
memory;
a network interface; and
at least one processor coupled to the memory and the network interface and configured to
receive, via the network interface from a session requester, a request to participate in a session, the request comprising a message that includes an identifier of the session requester,
determine a type of the session requester based on the identifier,
initiate one or more customer actions to configure the camera for the session in response to determining that the type of the session requester is a customer device,
initiate one or more monitoring center actions to configure the camera for the session in response to determining that the type of the session requester is a monitoring center device, and
establish, in compliance with a Web Real Time Communication framework, the session with the session requester upon configuration of the camera by initiating either the one or more customer actions or the one or more monitoring center actions.

11. The camera of claim 10, wherein the one or more customer actions comprises controlling a user interface of the camera to output an indication of the type of the session requester.

12. The camera of claim 10, wherein:
the camera is a location-based device; and
to receive the request including the identifier of the session requester comprises to receive an identifier of either a customer interface or a monitor interface.

13. The camera of claim 12, wherein the identifier specifies the type of the session requester, a timestamp, and an identifier of the camera.

14. The camera of claim 13, wherein the at least one processor is further configured to:
determine an actual identifier of the camera; and
compare the identifier of the camera to the actual identifier of the camera as part of a process to validate the identifier of the session requester.

15. The camera of claim 13, wherein the at least one processor is further configured to:
decode the identifier of the session requester to determine the type of the session requester, the timestamp, and the identifier of the camera.

16. A security system comprising:
a camera configured to host a first process, the first process being configured to
receive an identifier of a second process requesting to participate in a real time communication session with the first process;
determine a type of the second process based on the identifier;
in response to determining that the type of the second process is a customer device, configure the camera for the real time communication session, wherein to configure comprises to initiate one or more customer processes on the camera or to set one or more customer operational parameters of the camera other than communication session parameters;
in response to determining that the type of the second process is a monitoring center device, configure the camera for the real time communication session, wherein to configure comprises to initiate one or more monitoring center processes on the camera or to set one or more monitoring center operational parameters of the camera other than communication session parameters; and
establish, subsequent to configuration of the camera, the real time communication session with the second process.

17. The security system of claim 16, wherein the one or more monitoring center processes comprises recording the real time communication session.

18. The security system of claim 16, wherein to receive the identifier of the second process comprises to receive, by a process hosted by a location-based device, an identifier of either a customer interface or a monitor interface.

19. The method of claim 1, further comprising, after initiating the one or more actions to configure the camera, and after establishing the session in compliance with the WebRTC framework, opening a WebRTC communication channel with the session requester.

* * * * *